(12) United States Patent
Pasdar

(10) Patent No.: US 11,394,691 B2
(45) Date of Patent: Jul. 19, 2022

(54) ECOSYSTEM PER DISTRIBUTED ELEMENT SECURITY THROUGH VIRTUAL ISOLATION NETWORKS

(71) Applicant: Acreto Cloud Corporation, Jersey City, NJ (US)

(72) Inventor: Babak Pasdar, Jersey City, NJ (US)

(73) Assignee: ACRETO CLOUD CORPORATION, Jersey City, NJ (US)

( * ) Notice: Subject to any disclaimer, the term of this patent is extended or adjusted under 35 U.S.C. 154(b) by 3 days.

(21) Appl. No.: 16/000,294

(22) Filed: Jun. 5, 2018

(65) Prior Publication Data

US 2019/0372938 A1 Dec. 5, 2019

(51) Int. Cl.
*H04L 29/06* (2006.01)
*H04L 9/40* (2022.01)
*G06F 16/22* (2019.01)

(52) U.S. Cl.
CPC .......... *H04L 63/0272* (2013.01); *G06F 16/22* (2019.01); *H04L 63/029* (2013.01); *H04L 63/20* (2013.01)

(58) Field of Classification Search
USPC ........................................................ 380/277
See application file for complete search history.

(56) References Cited

U.S. PATENT DOCUMENTS

| | | | | |
|---|---|---|---|---|
| 8,695,059 B2 * | 4/2014 | Kopti | .................... | H04L 63/20 726/1 |
| 10,021,196 B1 * | 7/2018 | Akers | ................ | H04L 63/0272 |
| 10,200,249 B1 * | 2/2019 | Featonby | ................ | H04L 45/64 |
| 10,320,750 B1 * | 6/2019 | Brandwine | ......... | H04L 63/0428 |
| 2002/0070978 A1 * | 6/2002 | Wishoff | .................... | G06F 8/38 715/811 |
| 2002/0112052 A1 * | 8/2002 | Brittingham | ........ | G06F 9/44505 709/224 |
| 2002/0145626 A1 * | 10/2002 | Richards | ................ | G06Q 30/02 715/741 |
| 2004/0223497 A1 * | 11/2004 | Sanderson | .......... | H04L 12/4641 370/395.52 |
| 2005/0144481 A1 * | 6/2005 | Hopen | ................ | G06F 21/6218 726/4 |
| 2006/0230431 A1 * | 10/2006 | Jemes | .................... | H04L 63/102 726/1 |
| 2008/0155676 A1 * | 6/2008 | Johnson | .................. | H04L 45/00 726/13 |
| 2009/0222907 A1 * | 9/2009 | Guichard | .............. | H04L 63/102 726/17 |
| 2010/0077395 A1 * | 3/2010 | Edwards | ................. | H04L 12/66 718/1 |
| 2014/0331274 A1 * | 11/2014 | Bitton | ................. | H04L 63/1408 726/1 |
| 2015/0085664 A1 * | 3/2015 | Sachdev | ............. | H04L 41/5019 370/236 |
| 2015/0139238 A1 * | 5/2015 | Pourzandi | .............. | H04L 45/64 370/392 |

(Continued)

*Primary Examiner* — Maung T Lwin
(74) *Attorney, Agent, or Firm* — Wuersch & Gering LLP

(57) ABSTRACT

A method and system are provided to integrate IoTs and related components, users and applications into an ecosystem, and then on a per-component basis to provide real-time security solutions. Ecosystem security provides isolation, communications and security for technologies that fulfill a specific function or set of functions and their related and supporting platform elements.

254 Claims, 34 Drawing Sheets

(56) References Cited

U.S. PATENT DOCUMENTS

| | | | |
|---|---|---|---|
| 2015/0163206 A1* | 6/2015 | McCarthy | G06F 21/6227 713/171 |
| 2015/0256462 A1* | 9/2015 | Tripathi | H04L 47/11 370/236 |
| 2015/0269383 A1* | 9/2015 | Lang | H04L 63/20 726/1 |
| 2015/0310188 A1* | 10/2015 | Ford | G06F 21/10 726/28 |
| 2016/0006767 A1* | 1/2016 | Lain | H04L 45/02 726/1 |
| 2016/0285913 A1* | 9/2016 | Itskin | H04L 63/0236 |

* cited by examiner

1. Private Network 1 IoT 1 Type A
2. Private Network 1 IoT 2
3. Private Network 1 IoT 5 Type B
4. Private Network 1 Laptop 1
5. Private Network 1 IoT 9 Type C
6. Private Network 1 Mobile 5
7. Private Network 1 IoT 13 Type D
8. Private Network 1 Mobile 9
9. IoT 22
10. IoT 21
11. Cloud Network 1 Instance 1
12. Cloud Network 1 Instance 2
13. Cloud Network 1 Instance 3
14. Private Network 4 IoT 1 Type A
15. Private Network 4 Laptop 1
16. Private Network 4 IoT 5 Type B
17. Private Network 4 Mobile 1
18. Private Network 4 IoT 9 Type C
19. Private Network 4 Mobile 5
20. Private Network 4 IoT 13 Type D
21. Private Network 4 Mobile 9

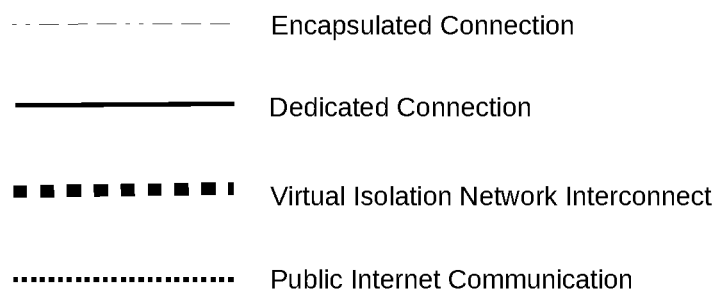

FIGURE 3

| Policy Rule ID | 816 | | | |
|---|---|---|---|---|
| | Source | Destination | Service | |
| ID | IOT-G-1029 | Any | Protocol | TCP |
| Type | Medical | Medical IoT Apps | Port \| Type/Code | 8821 |
| IP | Any | 1.2.3.0/27 | Application Protocol | HTTP |
| User | Any | Any | Application Program | MedIoT |
| Geography | Any | Any | | |
| Industry | Any | Any | | |
| Security Instance | SI-1-019 | Any | | |
| Netspace | Any | Any | | |
| Interface | Any | Any | | |
| | | | | |
| | + | + | | + |
| | Source 2 | Destination 2 | | Service 2 |
| | Source 3 | Destination 3 | | Service 3 |
| | Source 4 | | | Service 4 |
| | Source 5 | | | Service 5 |

FIGURE 10

| Policy Rule ID | | | | 816 | | | | |
|---|---|---|---|---|---|---|---|---|
| | | | | | | | | |
| External | | Notification | | Action | | Validators | | |
| Schedule | Any | Log | LOG-109 | | Allow | Threat | | |
| Index | None | Alert | ALR-33 | Drop | | Signature | TSIG-023 | |
| | | | | Reject | | Behavior | TBHV-023 | |
| | | | | Redirect | | | | |
| | | | | Flow Policy | | Content | | |
| | | | | | | URL | CCU-001 | |
| | | | | | | Data Pattern | CCD-239 | |

FIGURE 11

| Policy Rule ID: | 819 | | | |
|---|---|---|---|---|
| | Source | Destination | Service | |
| ID | Any | Any | Protocol | TCP |
| Type | Camera | Medical IoT Apps | Port \| Type/Code | 8821 |
| IP | Any | Med-IoT-3 | Application Protocol | HTTP |
| User | Any | Any | Application Program | MedIoT |
| Geography | European Union | Any | | |
| Industry | Smart Building | Any | | |
| Security Instance | SI-1-019 | Any | | |
| Netspace | Any | Any | | |
| Interface | Any | Any | | |
| | | | | |
| | + | + | | + |
| | Source 2 | Destination 2 | | Service 2 |
| | Source 3 | Destination 3 | | Service 3 |
| | Source 4 | | | Service 4 |
| | Source 5 | | | Service 5 |

FIGURE 12

| Policy Rule ID: | | | 819 | | | |
|---|---|---|---|---|---|---|
| External | | Notification | | Action | Flow Profile ID | Response Method |
| Schedule | Any | Log | LOG-109 | Allow | 7633 | Veto |
| Index | None | Alert | ALR-33 | Drop | 7633 | Veto |
| | | | | Reject | 7633 | None |
| | | | | Redirect | 7633 | None |
| | | | | Intercept | 7633 | None |
| | | | | Duplicate | 7633 | Veto |
| | | | | Flow Policy | 7633 | None |
| | | | | | 7633 | Consensus |
| | | | | | 7633 | Consensus |
| | | | | | 7633 | Consensus |
| | | | | | 7633 | Consensus |
| | | | | | 7633 | Consensus |
| | | | | | 7633 | None |
| | | | | | 7633 | None |
| | | | | | 7633 | None |
| | | | | | 7633 | None |
| | | | | | 7633 | None |

FIGURE 13

| Policy Rule ID: | | | 819 | | | | |
|---|---|---|---|---|---|---|---|
| Status | Sequence | Netspace | Module | Profile Policy | Action Score Threshold | Maven Action | Maven Score |
| Enabled | 1 | 3 | Access Control | AC-117 | --- | | |
| Enabled | 2 | 3 | Authentication | Auth-173 | --- | | |
| Disabled | --- | 3 | Load Balancing | --- | --- | | |
| Enabled | 3 | 2 | Layer 2 | L2-18 | --- | | |
| Enabled | 4 | 2 | Layer 3 | L3-18 | --- | | |
| Enabled | 5 | 2 | Access Control | AC-118 | --- | | |
| Disabled | --- | 2 | Authentication | --- | --- | | |
| Enabled | 6 | 2 | Application Control | APP-213 | 120 | Drop | 30 |
| Enabled | 7 | 2 | Threat (Signature) | THSIG-231 | | | 100 |
| Enabled | 8 | 2 | Threat (Behavior) | THBHV-27 | | | 0 |
| Enabled | 9 | 2 | Content Control (URL) | CCU-77 | | | 0 |
| Enabled | 10 | 2 | Content Control (Data Pattern) | CCD-93 | | | 0 |
| Disabled | --- | 2 | Proxy | --- | | | |
| Enabled | 11 | 1 | Layer 2 | L2-29 | | | |
| Enabled | 12 | 1 | Layer 3 | L3-29 | | | |
| Disabled | --- | 1 | Authentication | --- | | | |
| Disabled | --- | 1 | Load Balancing | --- | | | |

FIGURE 14

| Policy Rule ID: | 819 | | | |
|---|---|---|---|---|
| | Source | Destination | Service | |
| ID | Any | Any | Protocol | TCP |
| Type | Camera | Medical IoT Apps | Port \| Type/Code | 8821 |
| IP | Any | Med-IoT-3 | Application Protocol | HTTP |
| User | Any | Any | Application Program | MedIoT |
| Geography | European Union | Any | | |
| Industry | Smart Building | Any | | |
| Security Instance | SI-1-019 | Any | | |
| Netspace | Any | Any | | |
| Interface | Any | Any | | |

FIGURE 15

| Policy Rule ID: | | | 819 | | | | |
|---|---|---|---|---|---|---|---|
| External | | Notification | | Action | | Flow Profile ID | Response Method |
| Schedule | Any | Log | LOG-109 | Allow | | 7633 | Veto |
| Index | None | Alert | ALR-33 | Drop | | 7633 | Veto |
| | | | | Reject | | 7633 | None |
| | | | | Redirect | | 7633 | None |
| | | | | Intercept | | 7633 | None |
| | | | | Duplicate | | 7633 | Veto |
| | | | | | Flow Policy | 7633 | None |
| | | | | | | 7633 | Consensus |
| | | | | | | 7633 | Consensus |
| | | | | | | 7633 | Consensus |
| | | | | | | 7633 | Consensus |
| | | | | | | 7633 | Consensus |
| | | | | | | 7633 | None |
| | | | | | | 7633 | None |
| | | | | | | 7633 | None |
| | | | | | | 7633 | None |
| | | | | | | 7633 | None |

FIGURE 16

| Policy Rule ID: | | | 819 | | | | |
|---|---|---|---|---|---|---|---|
| Status | Sequence | Netspace | Module | Profile Policy | Action Score Threshold | Maven Action | Maven Score |
| Enabled | 1 | 3 | Access Control | AC-117 | --- | | |
| Enabled | 2 | 3 | Authentication | Auth-173 | --- | | |
| Disabled | --- | 3 | Load Balancing | --- | --- | | |
| Enabled | 3 | 2 | Layer 2 | L2-18 | --- | | |
| Enabled | 4 | 2 | Layer 3 | L3-18 | --- | | |
| Enabled | 5 | 2 | Access Control | AC-118 | --- | | |
| Disabled | --- | 2 | Authentication | --- | --- | | |
| Enabled | 6 | 2 | Application Control | APP-213 | 120 | Drop | 30 |
| Enabled | 6 | 2 | Threat (Signature) | THSIG-231 | | | 100 |
| Enabled | 6 | 2 | Threat (Behavior) | THBHV-27 | | | 0 |
| Enabled | 6 | 2 | Content Control (URL) | CCU-77 | | | 0 |
| Enabled | 6 | 2 | Content Control (Data Pattern) | CCD-93 | | | 0 |
| Disabled | --- | 2 | Proxy | --- | | | |
| Enabled | 7 | 1 | Layer 2 | L2-29 | | | |
| Enabled | 8 | 1 | Layer 3 | L3-29 | | | |
| Disabled | --- | 1 | Authentication | --- | | | |
| Disabled | --- | 1 | Load Balancing | --- | | | |

FIGURE 17

Element 1 MAC to IP - Address Resolution / Neighbor Discovery

| Address | Type | HW Address | Type | Interface |
|---|---|---|---|---|
| 77.77.77.1 | ether | AA:BB:CC:DD:EE:FF | Permanent | Net-I-1 |
| AAAA:BBBB::1 | ether | AA:BB:CC:DD:EE:FF | Permanent | Net-I-1 |
| 77.77.77.123 | ether | 11:22:33:44:55:66 | Permanent | Net-I-1 |

Element 1 Routing Table

| Network | Next-Hop | Admin Distance |
|---|---|---|
| 0.0.0.0/0 | 2.2.2.1 | 2 |
| ::/0 | 8888:9999::1 | 1 |
| 10.10.10.10/32 | 77.77.77.1 | 1 |
| 2001:2000:200/128 | AAAA:BBBB::1 | 1 |

ECOSYSTEM PER DISTRIBUTED ELEMENT SECURITY THROUGH VIRTUAL ISOLATION NETWORKS

BACKGROUND OF THE INVENTION

Internet-of-Things (IoT) are purpose-built technologies that communicate. They vary in size, capacity, resources, capability and cost. Their size ranges from sensors measured in millimeters to massive mining machines and therefore the scope of their capacity, resources and capabilities vary just as widely as their size. IoT technologies often do not adhere to standards and utilize imagination-driven hardware, software and purposes.

There are over 16 billion IoTs and the count is growing by orders of magnitude yearly, with growth forecast projections of 50+ billion in several years. IoTs often function as an extension of applications to collect data, perform a function or a combination. Communications can be initiated by IoTs, by applications or a combination. The applications, as well as the IoT and other devices, are often distributed and can operate on public networks such as the Internet, private networks or a combination. The combination of IoT and applications are extremely flexible and are expected to support a multiplicity of functions in their respective field of operation.

IoTs vary in size and can be incorporated into everything from supply chain management, physical security and surveillance systems, smart buildings, crypto and fiat currency-based systems, crypto and blockchain validation systems, transportation systems including ground, sea or air, vehicles, and implanted or external medical devices. IoTs interface with various systems including other IoTs, networks and or applications, communicating via a variety of wired and wireless networking and communications technologies.

IoTs do not function autonomously. Often, a co-dependency exists between the IoT, application platform and management platform; all of which may have a highly-distributed presence. IoTs may operate on one or many networks including public Internet, mobile networks, and private networks. The applications utilized by the IoT may operate on one or more of public or private clouds, data centers or SaaS applications. The IoT and or the applications may be managed by users and systems that may exist on other public and or private networks altogether. In some instances, the IoT, the network it operates on, the application, the users and the operators of the system may be completely independent entities from one another. This means that the IoT and the application may participate in an environment with multiple disparate entities as participants that may be third-parties to one another. As a result, security is increasingly complex where not only will the overall system need to be protected from non-participants, but the participants need to be protected from each other.

Furthermore, security erodes exponentially as more disparate IoTs and their supporting applications operate on a shared network. For example, a common scenario could be an office with multiple unassociated IoT applications where all IoTs share a common network, while their respective associated applications operate remotely. These IoT applications could include HVAC, fire-protection, video surveillance and key-card systems. Each of these may have multiple disparate operating parties for the different pieces that make up each of the IoT application platforms. For example, for each IoT type on the network, the IoTs may be owned by one entity, the network they operate on by another, the application they depend on to function by yet another entity, and they may be managed by altogether another third-party. This means that many different third-parties that share the use of the remote applications and the network have direct or indirect privileged access to the IoT devices that operate on that shared network. This type of broad cross application privileged access between components of the different IoT application platforms increases the attack surface for every system. An increased attack surface translates into greater exposure and risk.

Existing security options to protect IoTs, applications and users may rely on one or a combination of two models; endpoint and network security. Endpoint or on-device security suffers from resource limitations that constrain it to some fraction of the device's resources and capabilities. Furthermore, given the unique and purpose-built nature of many IoT devices, a limited number of security tools may exist that each offer only granular and incomplete protection. Worse yet, no security tools may exist at all for that IoT type. The endpoint security approach demands high ownership, administration and operations costs—especially for geographically distributed systems. These limitations, individually or together impose high cost and extreme challenges in securing IoT application platforms.

Network security, sometimes referred to as gateway security, does not suffer from the resource limitations as endpoint security does, however, network security tools have multiple other challenges when it comes to protecting IoT applications. Network security tools are static and unable to address highly-distributed, large-scale IoT devices. This is especially true for geographically disbursed and mobile devices. Network or Gateway security also requires many different piecemeal security technologies to be pooled and integrated and can only protect one component of the IoT application platform—the static application.

Use of prior art network or gateway security, platforms with shared policies and shared resources preclude or at least make it prohibitively difficult to implement per application, per function and per device security for the hosting entity, the third-party co-dependency application and other entities that rely on the services provided by any part of the IoT application. Gateway security tools include technologies such as: network firewalls, intrusion prevention and content control systems among others. As various IoT technology device brands are implemented on IoT application platforms, privileged access is necessary between the IoT and remote applications they depend on in order for the device, application or both to properly and fully function. Such access might take the form of the device initiating a connection (phone home) to the remote application(s) or conversely the remote application initiating a connection to the device for the issuance of executable commands, setting state, collection of information and or performance of a function.

Further, prior art security technologies tend to be granular and specific in the functions they perform. It is common to have one on-device tool to perform identity validation functions, another for access control, yet another for threat management and still another for content control functions. These tools and technologies function autonomously and in serial order—lacking awareness of how other tools are functioning and what the outcome of their function is. For example, a threat management tool (sometime referred to as Intrusion Prevention system or IPS) may be triggered by malicious content from one or more sources. However, operators of the access control system (firewall) may have no awareness of the malicious content and continue to allow communications and access from the malicious sources since the threat management and access control systems often function autonomously. Furthermore, given the wide variety of devices, hosts, systems and applications and their unique attributes, it is not uncommon for some technologies to have no viable security options for specified functions or any viable security options at all. This is especially the case for purpose-built IoT systems and platforms.

Even when endpoint and network security tools are used together, the result is expensive, complex and inconsistent security with many exposure points.

This creates security gaps in a number of ways:

A third-party has uncontrolled privileged access to one or more devices on the network that may allow access to the data flowing on that network.

Compromise or manipulation of the application may create exposure for some or all local and remote IoTs that the application supports.

Compromise of an application may lead to the compromise or corruption of the application's data-set.

Compromise or manipulation of any of the IoTs for related applications may create exposure for the applications regardless of where the application may be located.

Compromise or manipulation of any local IoT can lead to cross-compromise of other related or unrelated IoTs that exist on a shared network.

Cross-compromised unrelated IoTs may be used to compromise the associated applications that support the unrelated IoT.

Compromise of any IoT may lead to the compromise or corruption of its associated data-set.

The complexity of IoT application platforms has dramatically increased the ownership and operations burdens. Operators are forced to continually manage, monitor, troubleshoot, update and upgrade many disparate systems that form a ragtag assembly of disparate tools. There may be several different on-device security tools needed for each type of IoT to satisfy the required foundational security functions. Each of these have their own unique management and policy interface. Another handful of tools are needed for each and every cloud application, again each with their own management and policy interface. Another set of security tools is needed for each and every SaaS application. Yet another array of security tools is required for each office, data center or other facility. Once again, each of these tools have their own management interface. It is not uncommon to have several dozen tools for each type of IoT, Cloud, SaaS, Mobile device, remote user, office and data center platforms.

By virtue of the sheer number of tools, it is not surprising that a single organization has to manage thousands of policies across many teams and expertise domains. Prior art technologies and their associated complexity drive operators to focus their limited technical staff resources to managing tools rather than managing security. It is well recognized that with the increase in complexity there is a direct and exponential correlation to increased security exposure. With prior art technologies, operators are especially exasperated by the many different distributed technologies, where each technology silo requires multiple disparate tools, with each utilizing a unique management interface and requiring subject matter expertise. Simply said, the more convoluted and complex the security systems, the less secure the platform will be.

Over time and as old applications and systems are decommissioned and new applications and systems are implemented, even the most obsessive security teams develop gaps with overlapping, conflicting, overly broad, excessive and straggler policies. With prior art technologies, when a device, system application, server or other computing technology is disabled, decommissioned or deleted, the associated rule or policies on each and every related disparate network or security technology persists. The only option is to manually disable or delete them. Without automated tracking and association of the policies to applications and systems, security teams dare not disable or delete these policies for fear of impacting production applications or systems. The complex nature of accurately identifying, validating and managing the disable or delete process for these scattered policies across distributed devices, networks, technologies, geographies, security systems and teams is overwhelming.

With prior art technologies, updates and upgrades are a manual process that require individual organizations with varying subject matter expertise to learn about evolving threat types and methods and recognize that their existing technologies do not address them, at which point they must evaluate, acquire, implement, integrate, operationalize, manage, maintain, monitor, troubleshoot, and refresh their technologies every three to five years. This process is necessary for each and every individual security technology across every silo, and for every individual technology type that needs connectivity and protection. In many organizations, this means at least dozens of security tools and technologies resulting in perpetual and never-ending update, upgrade and re-architecture. As such, organizations that rely on and use prior art technologies will not recognize periods where updates and upgrades of the many individual technologies in their environment is considered completed.

Attempted solutions in the prior art focus on prioritizing the data load among the many security requirements presented. Solely by way of example is the system and method set forth in U.S. Pat. No. 9,652,612, entitled "Security Within a Software-Defined Infrastructure," by B. Brech et al. ("Brech"). Brech claims a method for sequestering all devices within a single network and prioritizing security functions with real time monitoring of such functions within the same network. While there is an expectation that multiple users may access the software-defined infrastructure, Brech offers no solution to the problem of range for large numbers of mobile and distributed devices beyond the reach of the network employed, nor does Brech allow for differentiating the security offered among various devices and or limiting services to specified application(s). The prior art leaves the network owner unable to easily or sustainably implement: access limits, controls, identity, protection and privacy between the device or devices and the remote application(s) and implement visibility and security on a per-device basis. Similarly, the network owner is faced with the complexity that arises from implementing, managing, troubleshooting and decommissioning policies, many of which are overlapping, and repetitive throughout all different components of the system and layers of the Operating System Interconnection (OSI) model.

SUMMARY OF THE INVENTION

The invention claimed closes the gaps in IoT security by offering a fully integrated ecosystem to provide connectivity and comprehensive management to seamlessly integrate a multiplicity of devices, networks, clouds, applications, software-as-a-service and cloud instances and further providing for easy-to-update security within the ecosystem. The invention provides for a method and system to integrate IoTs and related components, users and applications into an ecosystem, and then on a per-component basis provides real-time security solutions. Ecosystem security provides isolation, communications and security for technologies that fulfill a specific function or set of functions and their related and supporting platform elements. Platform elements can include devices, hosts, systems, applications, databases, networks, clouds, cloud networks, operating systems and any other component required for delivery of the platform's full functions.

A method for improving security and management of information technology by creating an identifiable ecosystem comprising: wherein the said at least one element communicates with at least one other element within the virtual isolation network but is restricted from communicating beyond the virtual isolation network. a) configuring at least one database to accept the registration therein of at least one virtual isolation network comprising at least one security instance operating at, at least one network security point, each security instance operating with at least one netspace, and each netspace hosting at least one module; b) configuring the said at least one virtual isolation network to accept the registration therein of at least one element; c) registering the said at least one element in the database; d) enabling the said at least one element to connect to at least one virtual isolation network via the said at least one security instance; e) isolating the said at least one element within the virtual isolation network; then f) applying at least one defined policy for communication between the said at least one element and a communication source or destination.

A method for improving security and management of information technology by creating an identifiable ecosystem comprising: wherein the at least one element communicates beyond the virtual isolation network; configuring at least one database to accept the registration therein of at least one virtual isolation network comprising at least one security instance operating at, at least one network security point, each security instance operating with at least one netspace, and each netspace hosting at least one module; configuring the said at least one virtual isolation network to accept the registration therein of at least one element; registering the said at least one element in the database; enabling the at least one element to connect to at least one virtual isolation network via the said at least one security instance; isolating the at least one element within the virtual isolation network; then applying at least one defined policy for communication between the at least one element and a communication source or destination.

A method for improving security and management of information technology through the use of an identifiable ecosystem comprising: wherein the policy rules define connectivity, network, security and profile policy types; configuring at least one database to accept the registration therein of at least one virtual isolation network comprising a plurality of security instances operating at a plurality of network security points, each security instance operating with a plurality of netspaces, and each netspace hosting a plurality of modules; configuring the said at least one virtual isolation network to accept the registration therein of a plurality of elements; registering the said plurality of elements in the database; enabling the said plurality of elements to connect to at least one virtual isolation network via the plurality of security instances; isolating the said plurality of elements within the virtual isolation network; then applying a plurality of policy rules to define communications through each security instance before and during the communications flow from, or to, the said plurality of elements.

BRIEF DESCRIPTION OF THE DRAWINGS

FIGS. 1, 2, and 3 depict an ecosystem with its associated sealed virtual isolation network and the plurality of interconnected network security points (NSP), according to the present invention. This outlines Ecosystem 123, its associated policy and Virtual Isolation Network 002 that span four NSPs. The ecosystem and its associated virtual isolation network are comprised of 12 security instances that span multiple NSPs with NSP 1 hosting security instances 8, 10 and 12; NSP 2 hosting security instances 7, 9 and 11; NSP 3 hosting security instances 6, 5 and 1; and NSP 4 hosting security instances 2, 3, and 4.

Figure 1:
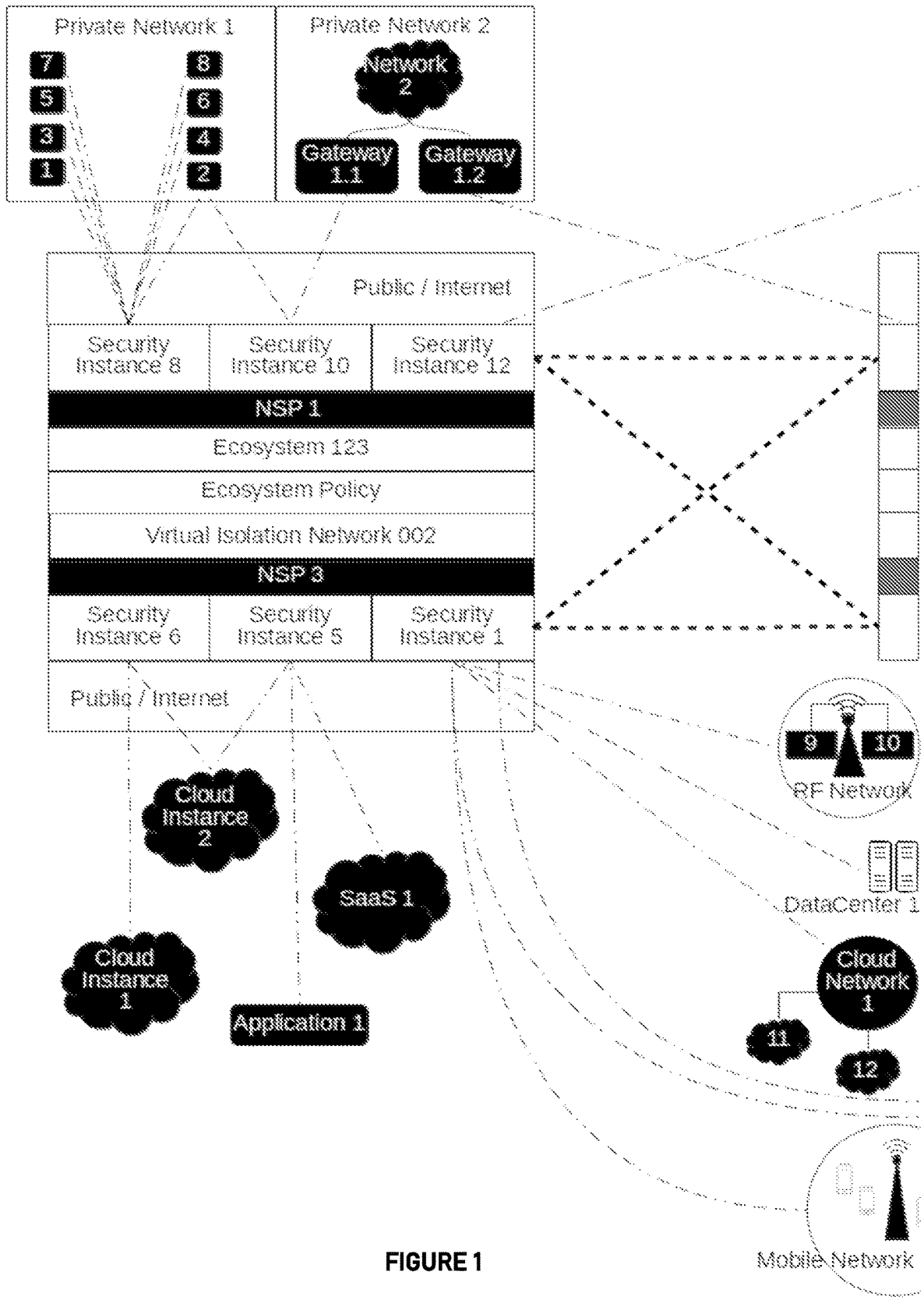

As depicted, security instances 1, 2, 12 and 7 function as interconnect primary, in their respective NSPs, and are connected to one-another, creating an interconnect mesh, where every interconnect primary connects to every other interconnect primary at remote NSPs, representing the method used to span the same ecosystem and virtual isolation network across multiple NSPs.

Private Network 1 demonstrates multiple IoT, Laptop and Mobile elements of varying types, each with its own encapsulated connection to NSP1/Security Instance 8. IoT2 in Private Network 1 demonstrates an element with multiple redundant connections to multiple security instances, in this case NSP1/Security Instance 8 and 10. All connections from Private Network 1 to NSP 1 use the public Internet. It is also possible for an element to support multiple redundant connections to security instances at two different NSPs as demonstrated by Cloud Network 1.

Private Network 2 demonstrates a network and the plurality of systems that operate on that network as well as connected networks, using redundant gateways Gateway 1.1 and Gateway 1.2 that function as a single high-availability gateway where Gateway 1.1 is connected to NSP1/Security Instance 10 and Gateway 1.2 is connected to NSP 2/Security Instance 7 via the public Internet.

Private Network 3 demonstrates another network and the plurality of systems that operate on that network as well as connected networks, using redundant gateways Gateway 2.1 and Gateway 2.2 that function as a single combined high-availability gateway where Gateway 2.1 is connected to NSP1/Security Instance 12 with an encapsulated connection via the public Internet, and Gateway 2.2 via a dedicated connection to NSP 2/Security Instance 9.

Private Network 4, in a similar manner to Private Network 1, demonstrates multiple systems of various types, each with its own encapsulated connection to NSP2/Security Instance 11 via the public Internet. Within this ecosystem configuration it was determined that it was not necessary for any of the elements on Private Network 4 to require redundant connections to multiple security instances at the same or different NSPs.

Cloud Instances 1 and 2 are connected to NSP 3/Security Instance 6 with an encapsulated connection via the public Internet, while Cloud Instance 2 also has a second encapsulated connection to NSP 3/Security Instance 5 via the public Internet. Multiple connections may be used for the purposes of resiliency, scalability or performance optimization.

Application1 and SaaS1 demonstrate how individual applications and SaaS services may connect to NSP 3/Security Instance 5 with an encapsulated connection via the public Internet.

Data Center 1 and Cloud Network 1 demonstrate support for physical and virtual networks where a plurality of physical and virtual systems may benefit from this invention via individual and gateway connections to multiple NSPs via a variety of connection methods. In this case both Data Center 1 and Cloud Network 1 connect to NSP 3/Security Instance 1 with an encapsulated connection via the Internet and NSP 4/Security Instance 2 with a dedicated connection.

RF Network and Mobile Network represent private networks that themselves may be connected to the ecosystem virtual isolation network with encapsulated connection via the public Internet as represented by the connection to NSP 3/Security Instance 1 and dedicated connection NSP 4/Security Instance 2 serving as an external network, where there is a communication agreement between a third-party and the ecosystem operator. Or alternatively these networks may also function as an extension of the public Internet.

IoT20 demonstrates the use of a private back-haul network (Mobile Network) as an external/extranet connection, where a common or proprietary connection type is used to haul all communications to and from IoT20 and a destination, as permitted by the operator, via either NSP 3/Security Instance 1 or NSP 4/Security Instance 2. IoT20 is also configured to use an encapsulated connection, using another network type such as WiFi, via the public Internet to establish a second connection to NSP 4/Security Instance 3. IoT17 and IoT19 exemplify networks such as the RF Network or Mobile network used as an extension of the public Internet, where they connect to NSP 3/Security Instance 1 with encapsulated connections via the private network's connection to the public Internet.

Application 2 demonstrates the ability for the application to use a dedicated connection to NSP 4/Security Instance 2.

Laptop 2 and IoT18 demonstrate an encapsulated connection via the public Internet to NSP 4/Security Instance 3, where IoT18 has a second encapsulated connection to NSP 4/Security Instance 4.

SaaS2 and Application3 demonstrate that they may be protected by NSP 4/Security Instance 4 without any connection to the servicing or other NSP and security instances. Access to SaaS2 and Application3 are configured to only accept communications, using a public network, from NSP 4/Security Instance 4. NSP 4/Security Instance 4 advertises access to SaaS2 and Application3 either via an address such as FQDN or IP address. All communications destined to SaaS2 and Application3 for Internet Public Users and others is received by NSP 4/Security Instance 4 where policy is applied and if appropriate, the communication is redirected to SaaS2 and or Application3 that are configured to only accept communications from a specified IP at NSP 4/Security Instance 4. The converse of this is also true where SaaS2 and Application3 may initiate communication with Internet Public Users and other ecosystem elements via NSP 4/Security Instance 4. No other communication is accepted by SaaS2 and Application3 other than to and from NSP 4/Security Instance 4. In this example SaaS2 and Application3 are non-connected member elements of the ecosystem, otherwise, member elements use connections to enable the flow of communications to and from other member or non-member element through their respective security instance(s).

Figure 4:
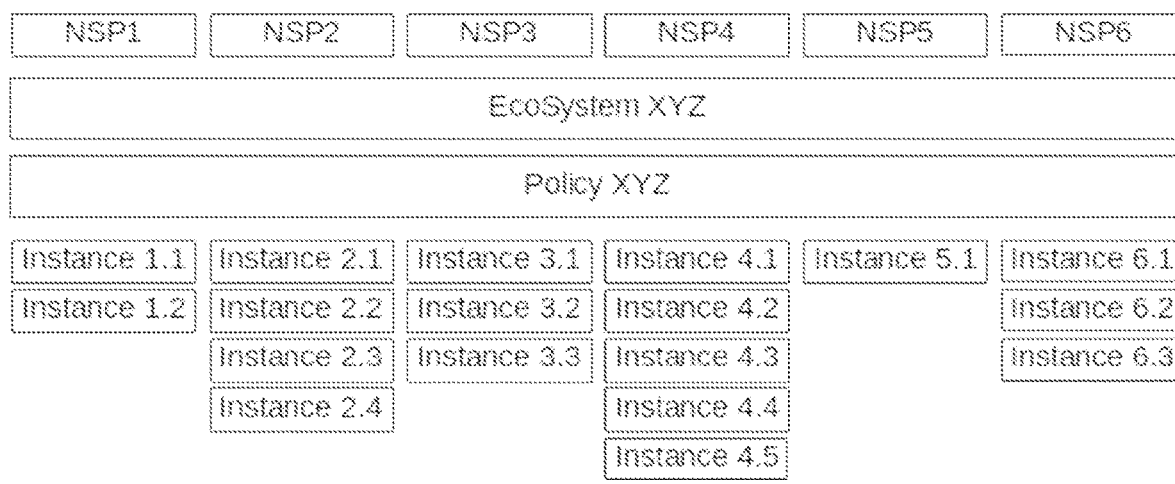

FIG. 4 depicts the configuration of the Ecosystem and its associated policy across multiple NSPs, according to the present invention. One or more security instances at each NSP actively and simultaneously deliver on the functionality that the policy calls for. The first security instance activates the ecosystem at the NSP and each additional security instance increases the ecosystem virtual isolation network resiliency, capacity (ability to support an increased communication volume from elements) and scalability.

Figure 5:
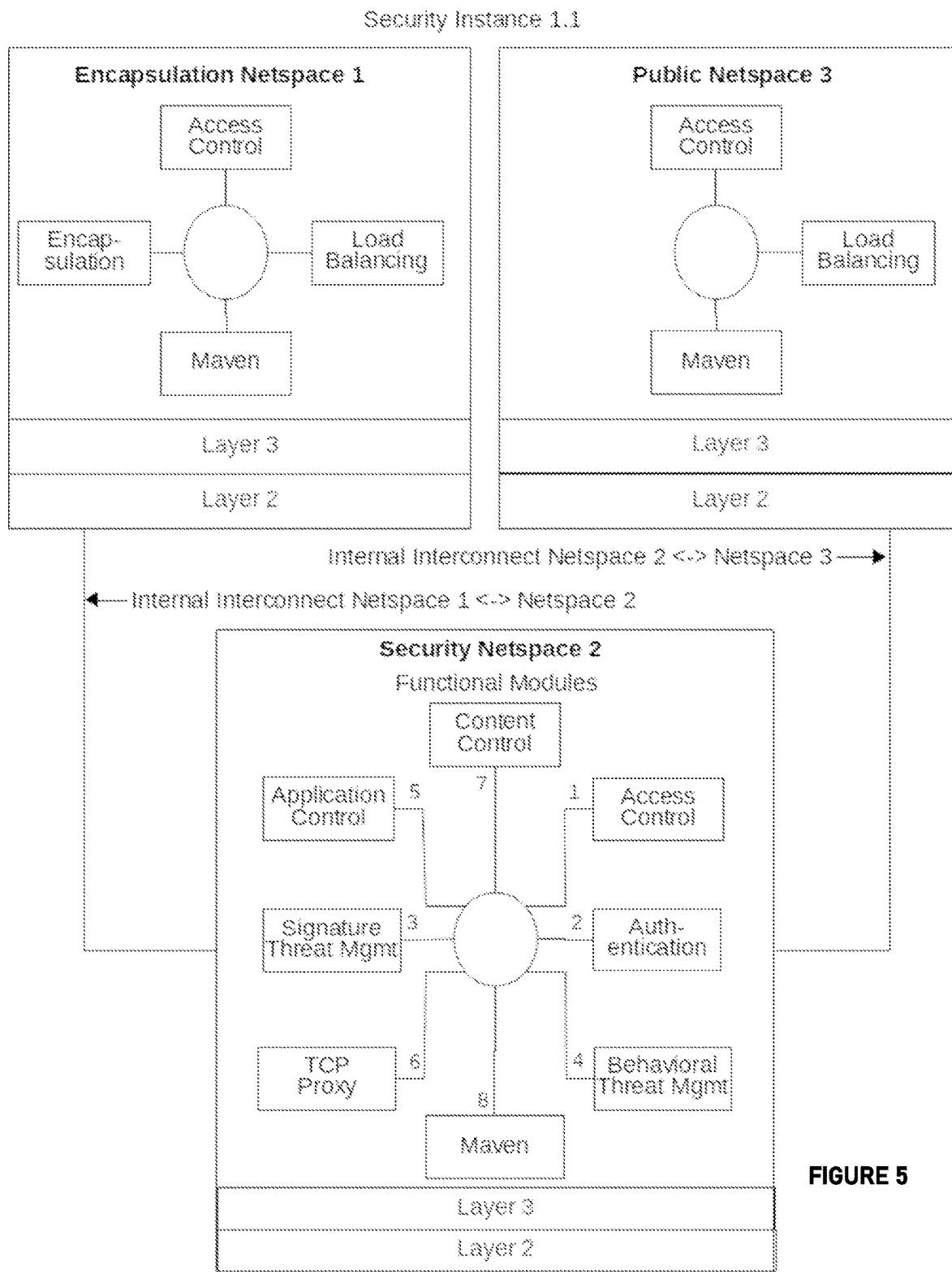

FIG. 5 depicts the makeup of Security Instance 1.1 of the present invention, which presents a security instance comprising modular interconnected netspaces each with functional modules. Each netspace operates on a common kernel with each supporting a dedicated OSI Layer 2 through 7 networking stack and capability to run segregated applications. Encapsulation Netspace 1 is outfitted with Layer 2 and Layer 3, Encapsulation, Access Control, Load Balancing and Maven modules that is connected via Internal Interconnect Netspace 1↔Netspace 2 to Security Netspace 2 with Layer 2, Layer3, Access Control, Authentication, Signature Threat Management, Behavioral Threat Management, Application Control, TCP Proxy, Content Control and Maven modules that is connected via Internal Interconnect Netspace 2↔Netspace 3 to Public Netspace 3 with Layer 2, Layer 3, Access Control and Load Balancing modules. Communication flow may be initiated either with Public Netspace 3 or Encapsulation Netspace 1 as the initial point of entry or a combination.

Figure 6:
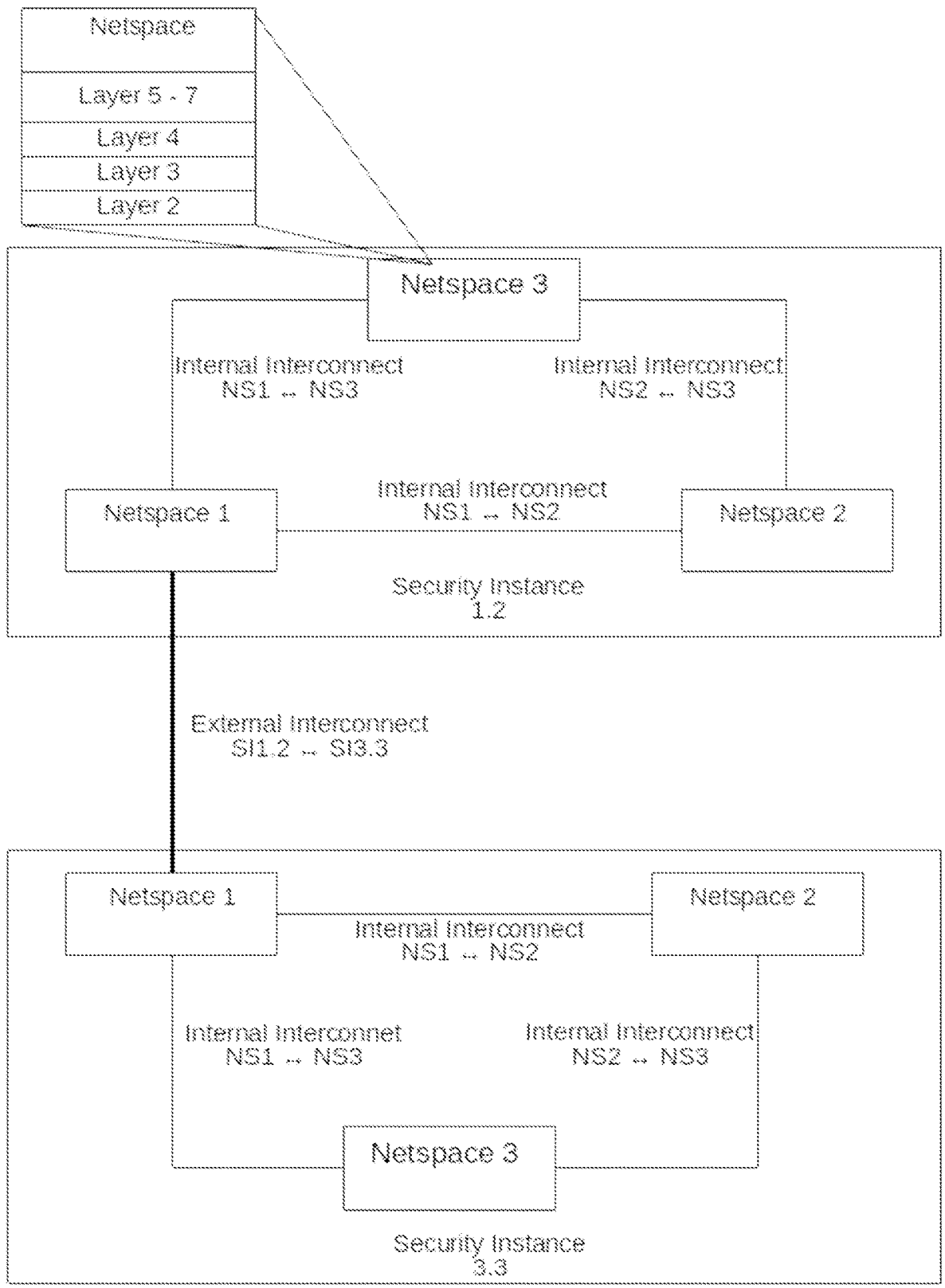

FIG. 6 depicts a plurality of netspaces that make up the security instance's internal and external interconnects with one another in the present invention. FIG. 6 demonstrates connections between security instance 1.2 and netspaces 1, 2 and 3 with internal interconnect connection type. Similarly, security instance 3.3 also demonstrates netspaces 1, 2 and 3 connectivity with internal interconnects. Security instances 1.2 and 3.3 are connected via an external interconnect at netspace 1 on each security instance respectively.

Figure 7:
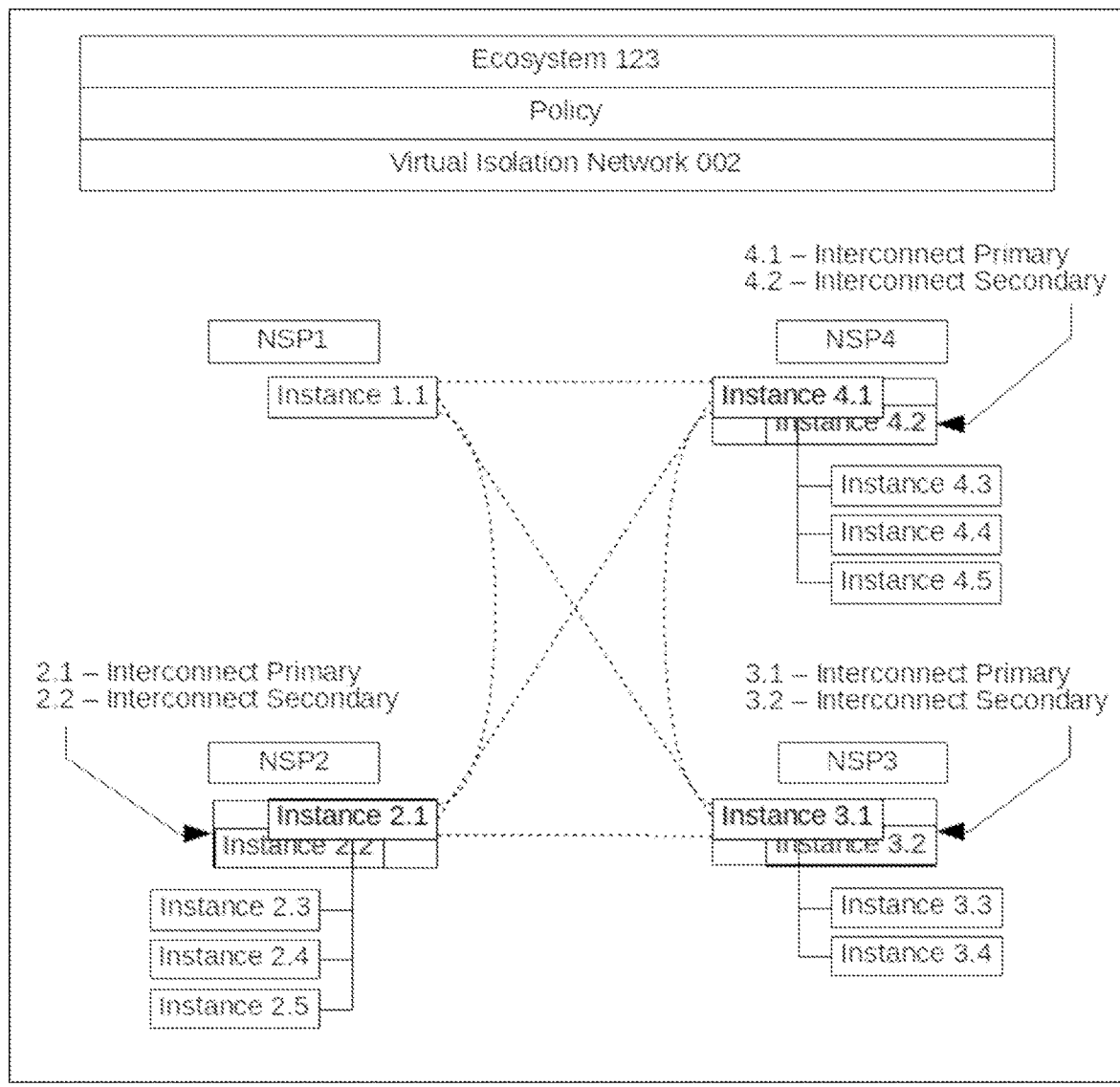

FIG. 7 depicts member security instances of an ecosystem virtual isolation network that serve as interconnect primary and secondary, where within each NSP a security instance is selected for the interconnect primary role and optionally another for the interconnect secondary role. All other member security instances within the NSP connect to the selected interconnect primary and secondary security instances. The interconnect primary and secondary security instances function as a conduit between all virtual isolation network security instances within the NSP as well as security instances that belong to the same virtual isolation network at other NSPs. The interconnect primary and secondary are connected to other interconnect primary and secondary security instances at other NSPs to service all security instances at that NSP or directly to security instances at remote NSPs should the use interconnect primary and secondary security instances not be justified at that NSP.

As demonstrated in the above diagram, NSP1 with a single security instance does not justify an interconnect primary and secondary pair and supports all external interconnects directly to security instance 1.1, while interconnect primary and secondary pair 2.1 and 2.2, 3.1 and 3.2 as well as 4.1 and 4.2 are interconnected to all security instances in their home NSPs respectively, and security instance 1.1 at NSP1 along with interconnect primary and secondary pairs at NSP2, NSP3 and NSP4.

Figure 8:
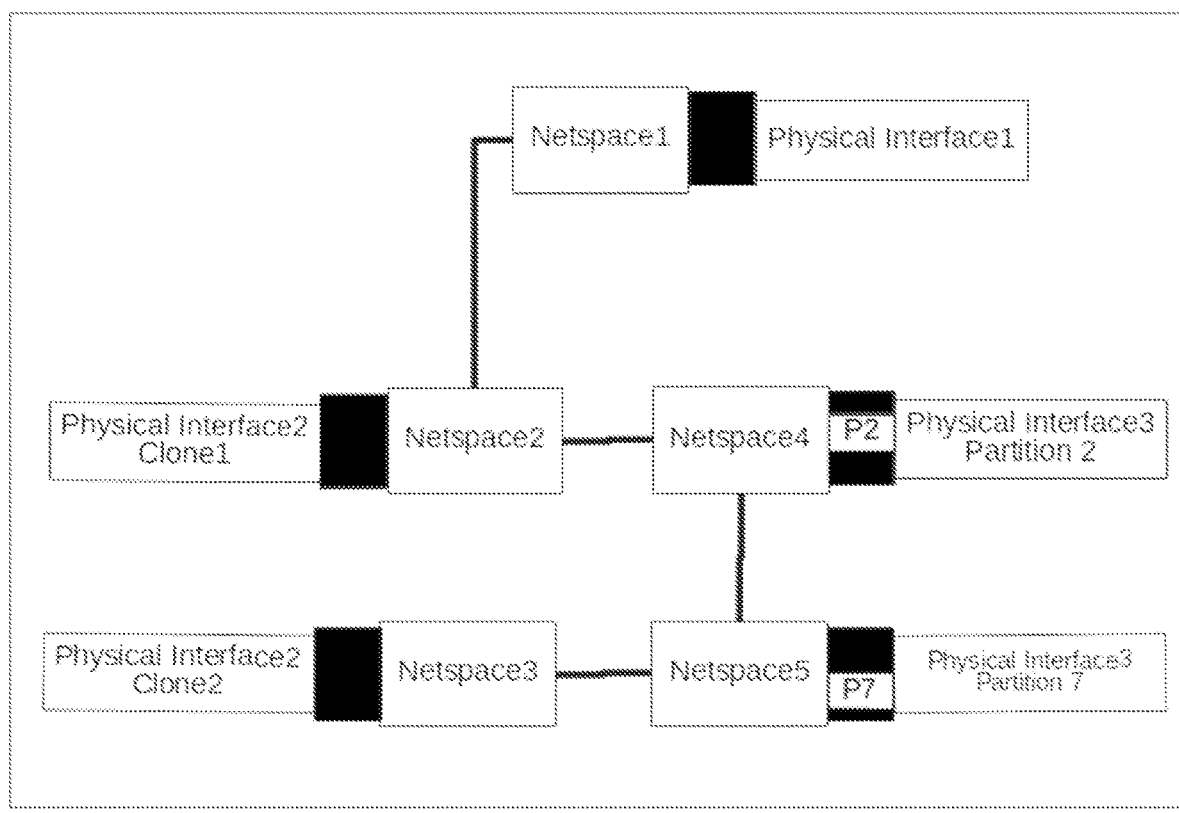

FIG. 8 depicts the plurality of network interface types including physical network Interface as represented by Physical Interface 1 that is connected and dedicated exclusively to a netspace, in this case Netspace1; cloned virtual network interfaces which are a virtualized physical network interface that are virtually cloned multiple times as is required, as demonstrated by Physical Interface2 Clone1 designated to Netspace2 and Physical Interface2 Clone2 designated to Netspace3 and; partitioned virtual network interfaces that represent physical network interfaces that are comprised of two or more partitions where each of the partitions is virtually designated to at least one netspace as represented by Physical Interface3 Partition2 that is allocated to Netspace4 and Physical Interface3 Partition7 assigned to Netspace5.

Figure 9:
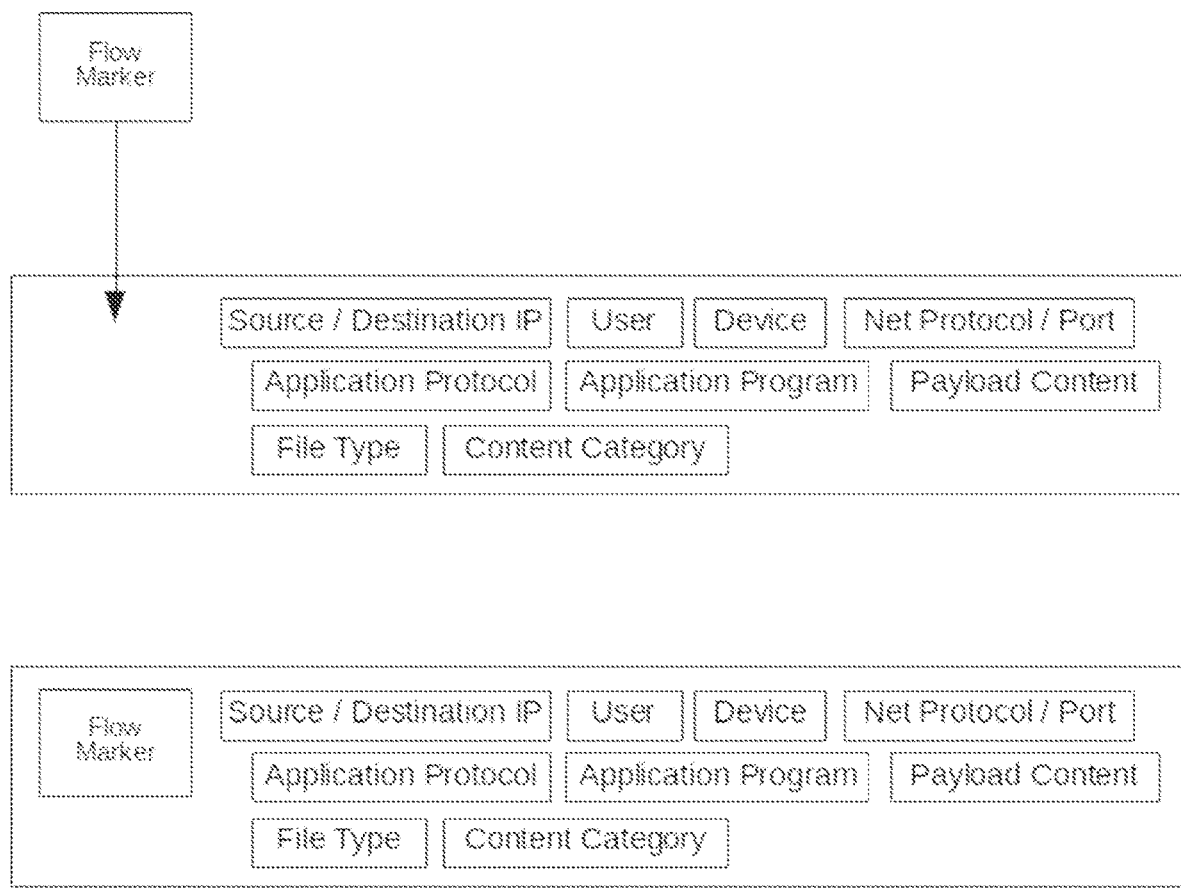

FIG. 9 depicts the method which injects a flow marker into a communication based on policy triggers. The flow marker represents a reference to a flow profile policy that identifies if and in what sequence netspaces and associated modules within each netspace should be activated and utilized.

FIGS. 10 and 11 depict a policy rule, where the section's source, with associated device ID, type, IP address, user, geography, industry, and source security instance, netspace and interface; along with destination with associated device ID, type, IP address, user, geography, industry, and source security instance, netspace and interface; and network with its associated protocol, port or type/code, application protocol and application program; as well as external schedule and index may be used in any combination to function as a trigger. Note that multiple sources, destinations, networks and external may be defined in a single rule to build complex triggers as depicted above with sources 2 through 5, destinations 2 and 3 as well as network service/app 2 through 5.

This rule, as shown, triggers when the device ID is a specific device or group of devices IOT-G-1029 and the associated type is medical device while the destination is any system of the type Medical IoT Apps on the 1.2.3.0/27 network and using protocol TCP on port 8821 with the HTTP application protocol and the MedIoT application program. No external triggers are defined. However, if the trigger matches, then the rule uses four different validators with the object of the triggered rule. These include threat (signature) using profile policy TSIG-023, threat (behavior) using profile policy TBHV-023, content control (url) using profile policy CCU-001 and content control (data pattern) using profile policy CCD-239. If no violation scenarios are triggered as defined by the various profile policy used with the validators, the action is allowed. If violation scenarios are triggered, the action or actions defined by the profile policies are implemented.

FIGS. 12, 13, and 14 depict policy 819, where if triggered based on pre-specified communication attributes (identified as source, destination and service sections and external) implements flow profile policy 7632 as the policy rule action. Flow profile policy 7632 defines the initial netspace to receive the communication is Netspace 3 using the veto response method for both active modules that include Access Control and Authentication, where the violation scenario actions are implemented immediately.

This is followed by Netspace 2 where the response method changes to consensus, where an appropriate action score is assigned. As the communication is processed, if it violates each active module's policy profile, the designated action value is forwarded to the maven module. The module's profile policy may define a plurality of violation scenarios, each with their own action value. For example, the signature threat module may have multiple profile policies to be used with different rules, each with many multiples of violation scenarios, and each violation scenario with its own action value for the consensus response methods.

If the communication final action score as processed by the maven module does not exceed the action score threshold, it is forwarded to Netspace 1, with Layer 2 and Layer 3 active modules. The authentication and load balancing modules are not active for Netspace 1 and thereby bypassed.

Similar to above, FIGS. 15, 16, and 17 depict a triggered policy rule with a flow profile policy, where after sequence 5 the object of the policy rule trigger is replicated and simultaneously directed to the following modules and their associated profile policy: application control using profile policy APP-213, threat (signature) using profile policy THSIG-231, threat (behavior) using profile policy THBHV-27, content control (url) using profile policy CCU-77, and content control (data pattern) using CCD-93, where each processes the object of the policy rule trigger match and if there is a violation scenario triggered, the action score value defined in the triggered violation scenario is forwarded to the maven module. Based upon the flow of communications, the maven module tabulates the corresponding action scores in real time into a maven score. At the point where the maven score exceeds the action score threshold, the action defined in the maven action is implemented.

Figure 18:
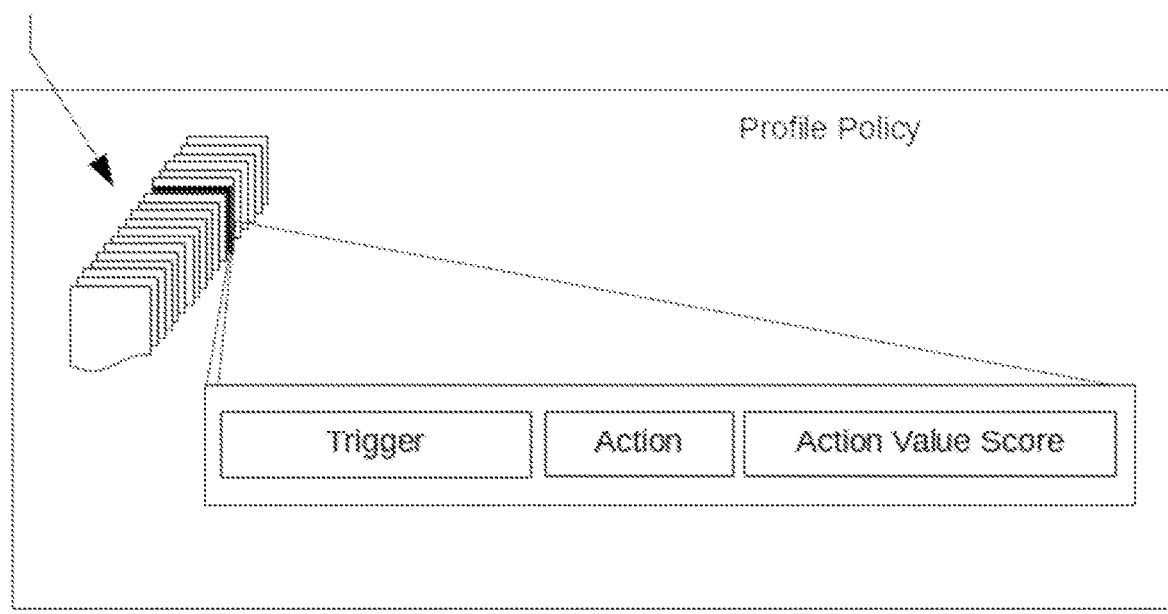

FIG. 18 depicts a policy profile with a plurality of violation scenarios, each with a trigger, action and action value score as designated by the operator.

Figure 19:
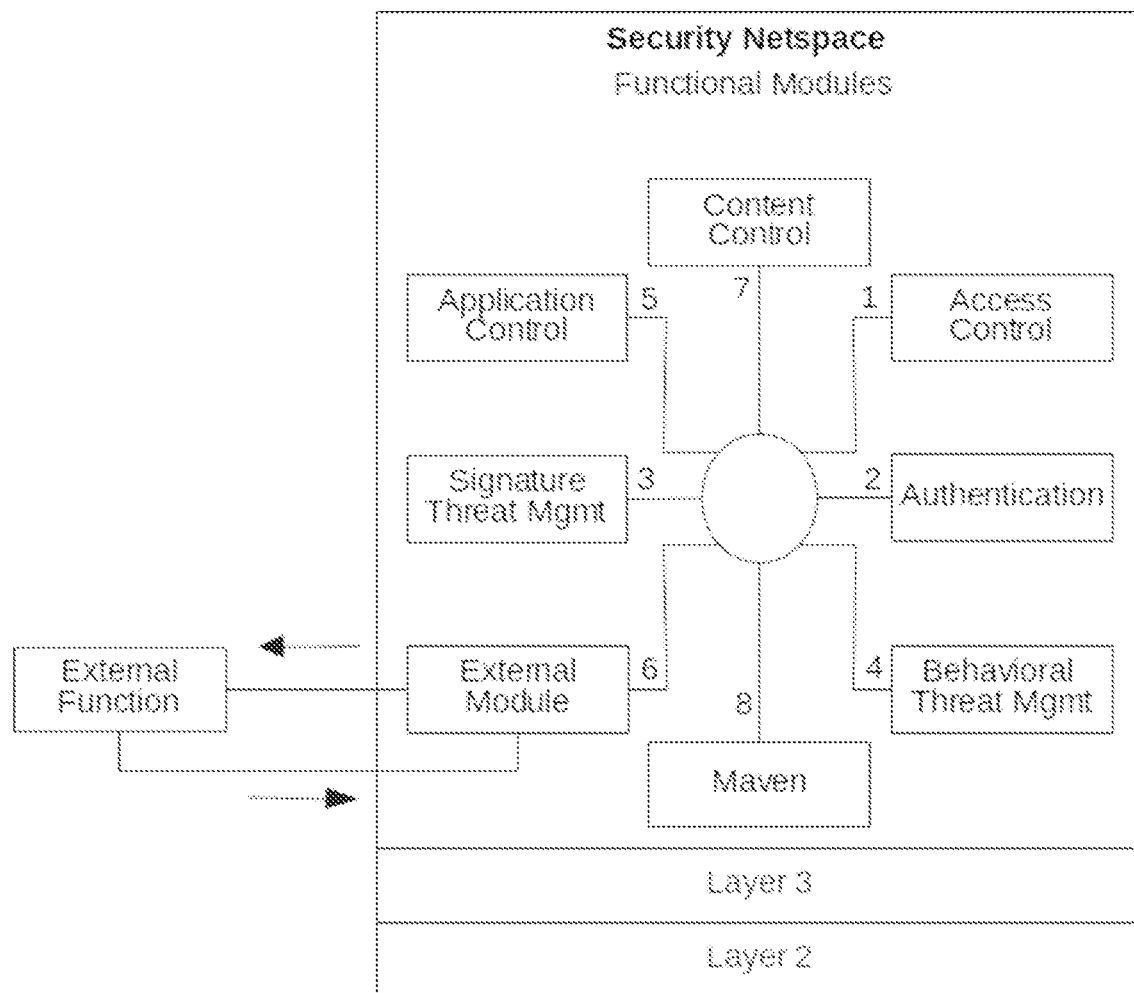

FIG. 19 depicts a capability and configuration of the present invention whereby the active module and serial flow sequence is highlighted. In an embodiment of the invention, this netspace, recognized as Security Netspace, processes communication serially by applying in the following sequence the functional capabilities of the 1) Access Control, 2) Authentication, 3) Signature Threat Management, 4) Behavior Threat Management, 5) Application Control modules. The communication is then forwarded to the 6) External Module that performs some function as per the capabilities of the External Function before forwarding the communication back to the Security Netspace where it is processed by 7) the Content Control module. If the maven module is enabled it would tabulate the action scores provided by each module after processing the communication into a running summary called the maven score. Should the maven score equal or exceed the preconfigured action score threshold, the maven action is implemented. Layer 2 and Layer 3 behavior is defined by the network policy, where access control, authentication, signature threat management, behavioral threat management, application control, content control and maven are represented by the security policy and profile policy types. Depending on the function of the external module its configuration may be defined by connectivity, network, security, profile policy or in combination. The external module may be represented by any type or combination of policy types depending on its functional capabilities as they are not specifically represented in this example.

Figure 20:
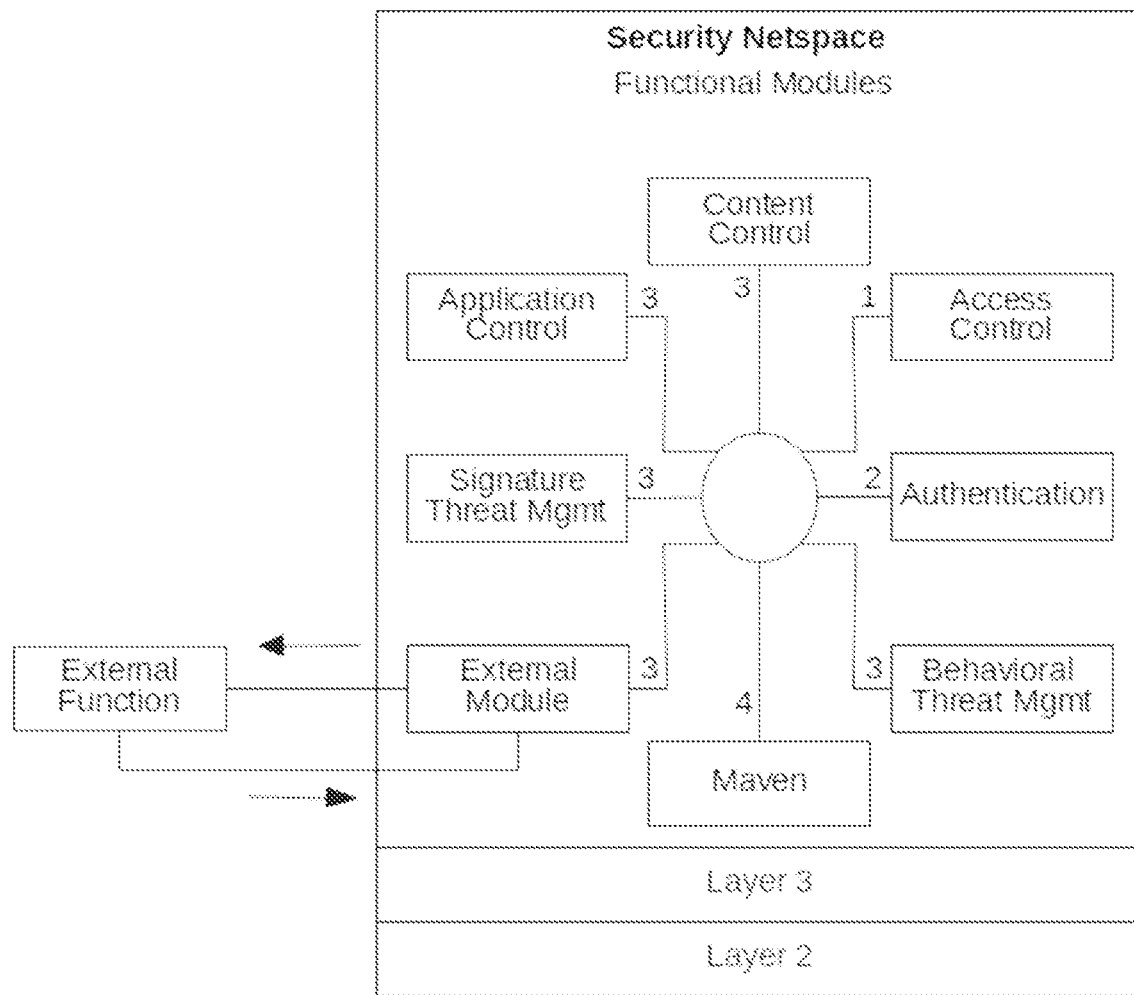

FIG. 20 depicts a capability and configuration of the present invention whereby similar to FIG. 19, the active module as well as serial and parallel flow sequences are highlighted. In an embodiment of the invention, this netspace recognized as Security Netspace, processes communication in both serial and parallel form by applying the communication to different modules in a predefined sequence where the modules 1) Access Control, 2) Authentication are processed in serial form and 3) Signature Threat Management, 3) Behavior Threat Management 3) Application Control and 3) Content Control are processed simultaneously in parallel form. If the 4) maven module is enabled, the communication would be serially processed by the maven module next.

Figure 21:
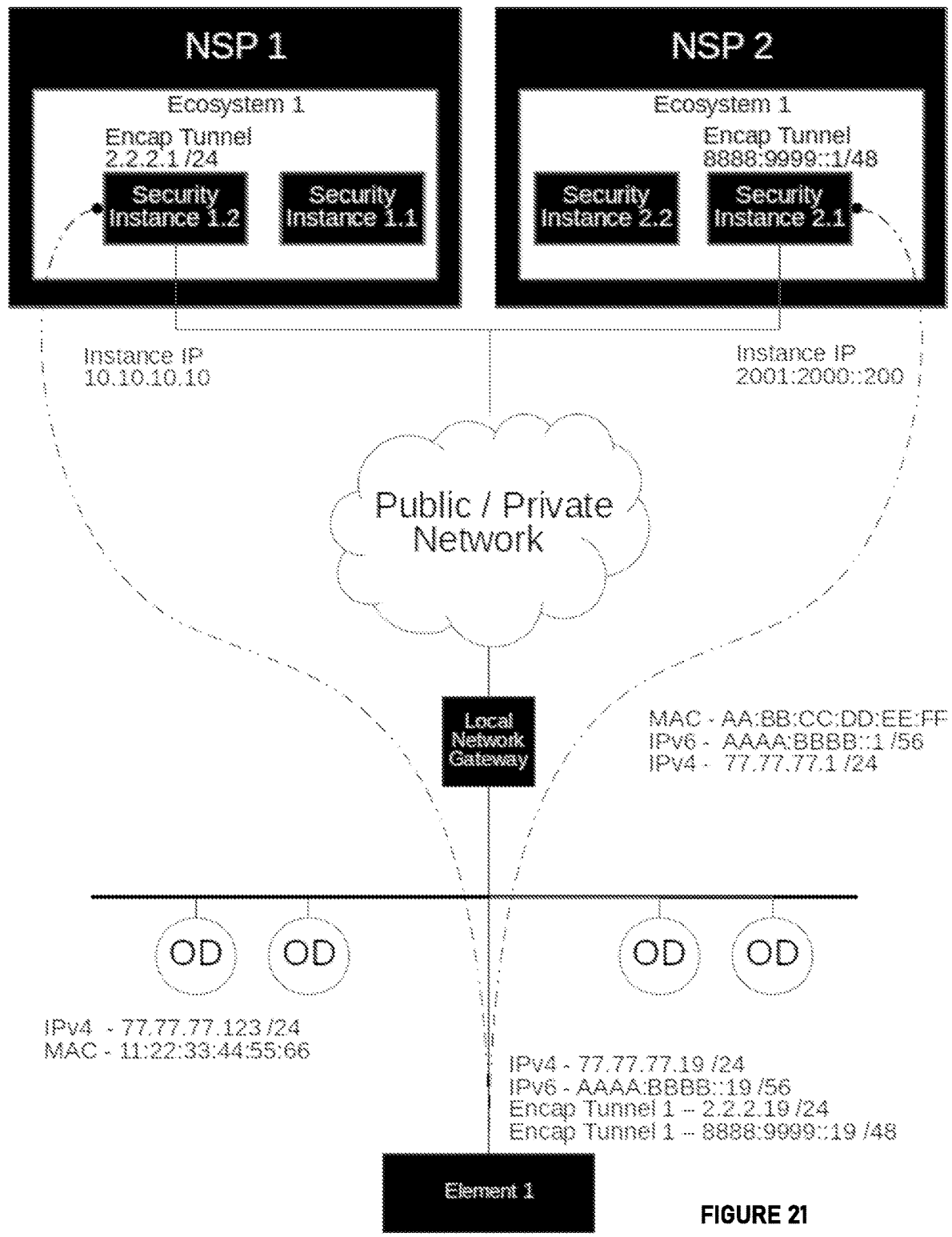
Figure 22:
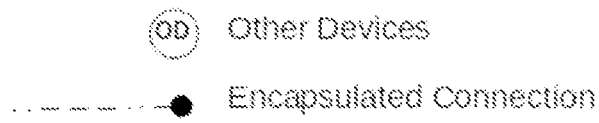

FIGS. 21 and 22 depict a capability of the present invention whereby an element of the ecosystem that exists on a private network connects to multiple NSPs by building an encapsulated connection to each. Once the default gateway that supports the connection to the NSPs has been identified, the element becomes isolated and unresponsive to any other direct (unicast), multicast or broadcast layer 2 and layer 3 queries from systems on any local or remote networks, limiting its communications to the designated virtual isolation network security instances at NSP1 security instance 1.2 and at NSP2 security instance 2.1. All communications are directed via the tunnels to the designated security instances.

Figure 23:
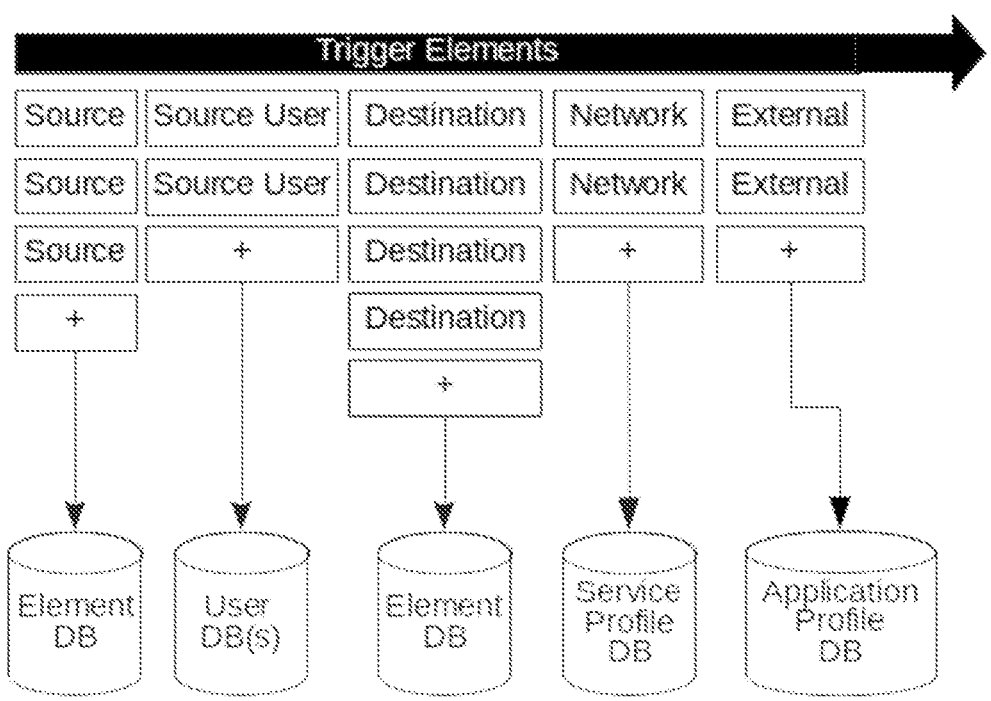
Figure 24:
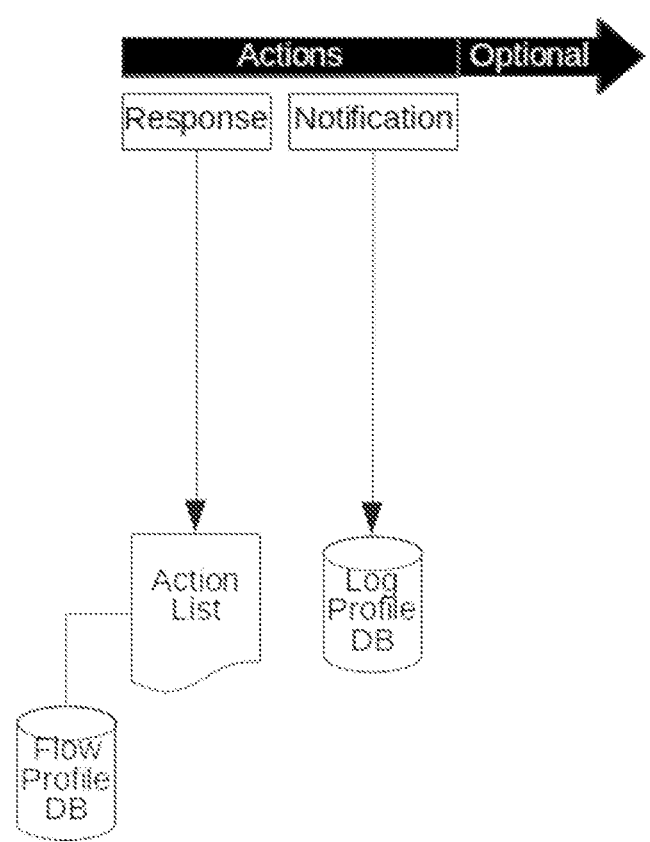
Figure 25:
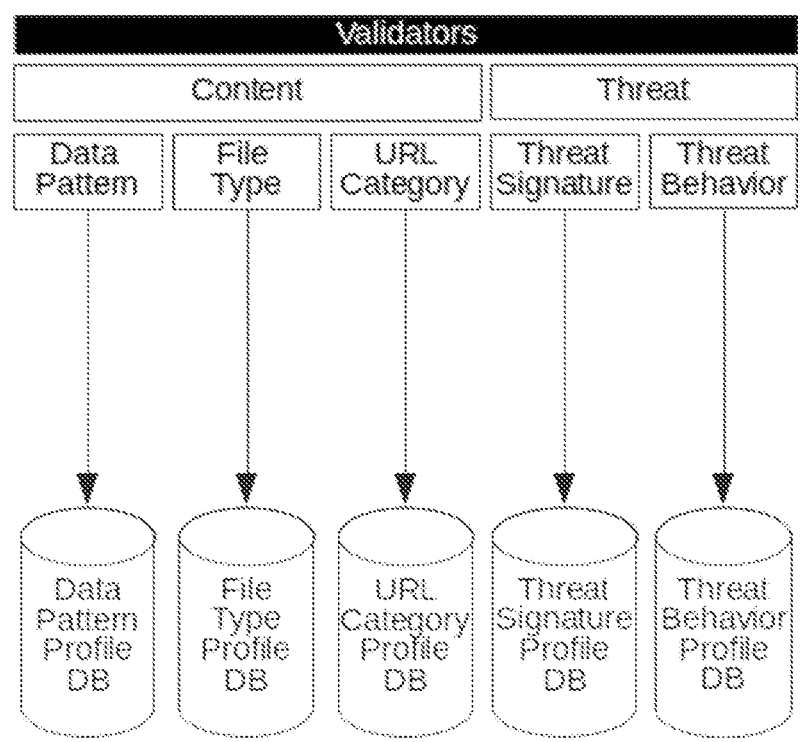

FIGS. 23, 24, and 25 depict a configuration of the present invention demonstrating the triggers, actions and validators aspect of the policy rule, where a plurality of sources, users, destinations, network and external identified and defined in a designated database, function as triggers where if the trigger criteria is met, the defined actions (i.e., the action list) and optionally validators are invoked. The + box underneath each trigger element demonstrates the ability to add multiple of each element type. Each of, elements, users, networks, actions, flow and notifications are identified and defined in the database. Optionally validators, which include signature and behavior threat management, as well as various forms of content controls, are each defined and operate in the designated configuration and profile section of the database or a designated dedicated database.

Figure 26:
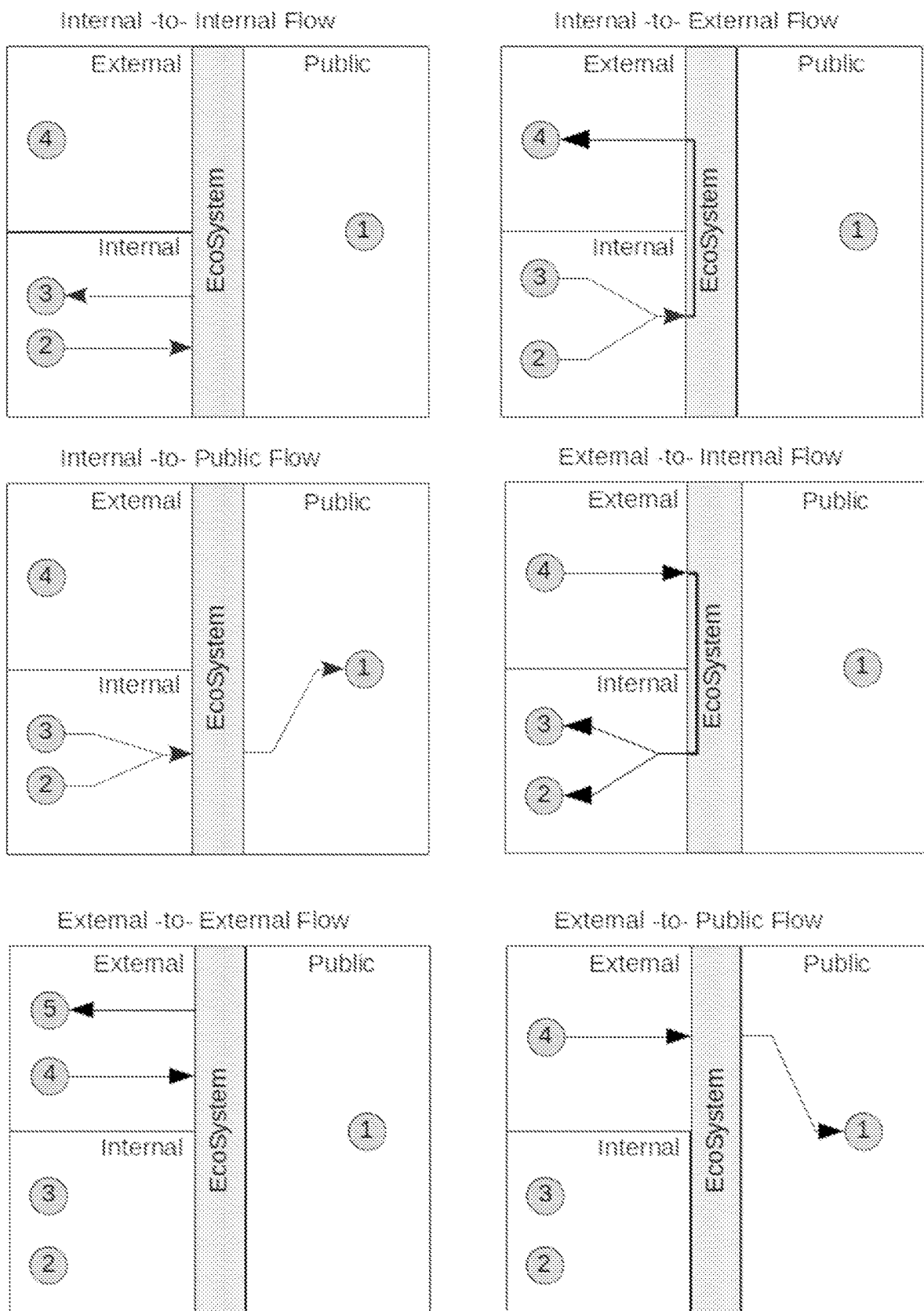
Figure 27:
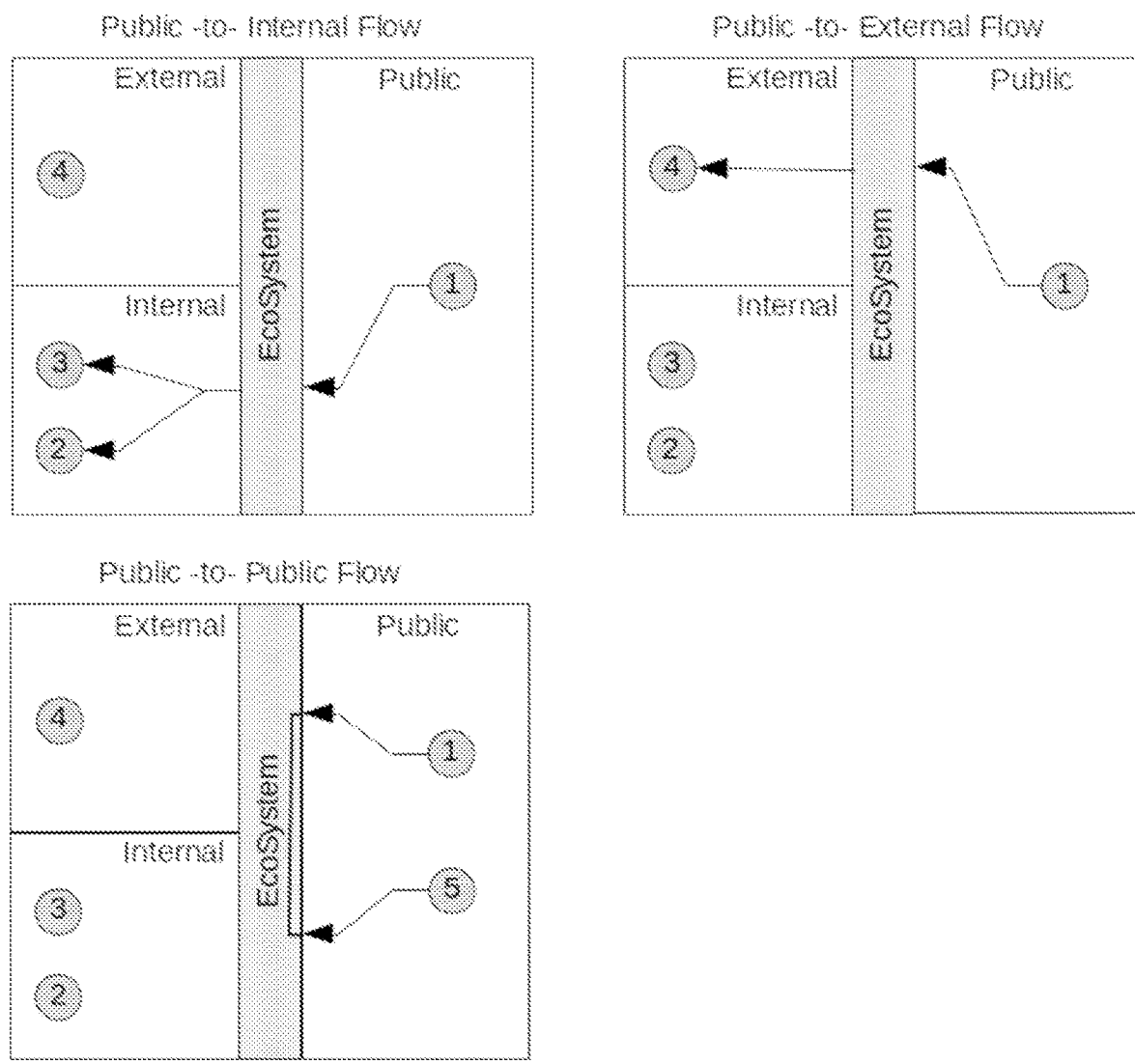

FIGS. 26 and 27 depict a capability of the present invention whereby a combination of flow perspectives may be implemented as defined by the operator. This includes any combination of flows where modular functional capabilities of the system may be implemented that incorporate internal (within the ecosystem virtual isolation network), external (third-party with a communications agreement) and public (Internet) networks. Particularly notable are the invention's capabilities to apply its functions to internal-to-internal, external-to-external and public-to-public communications.

Figure 28:
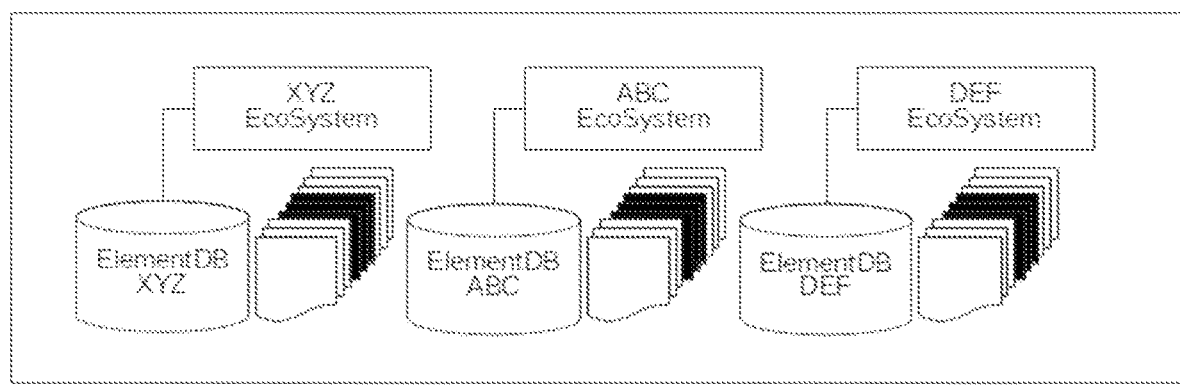
Figure 29:
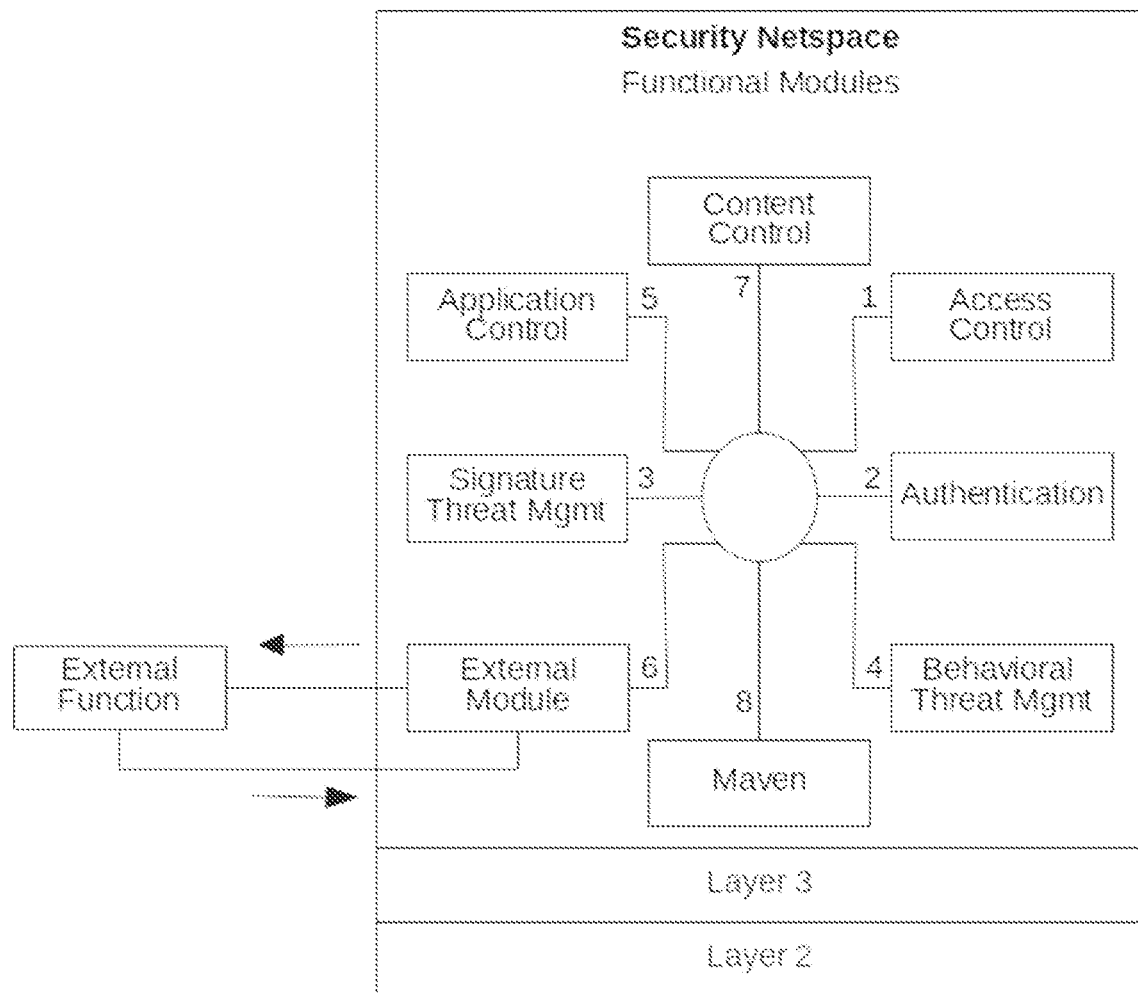
Figure 30:
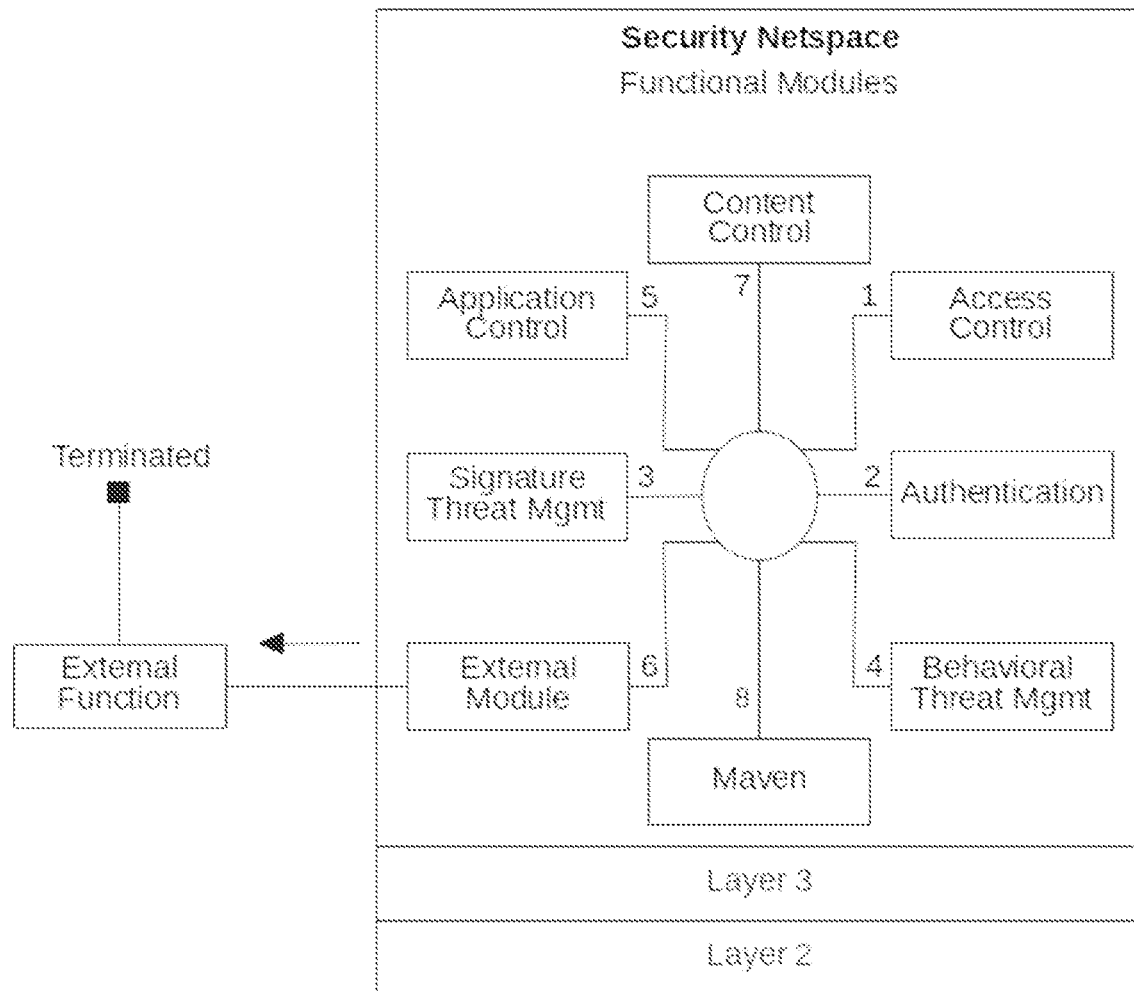
Figure 31:
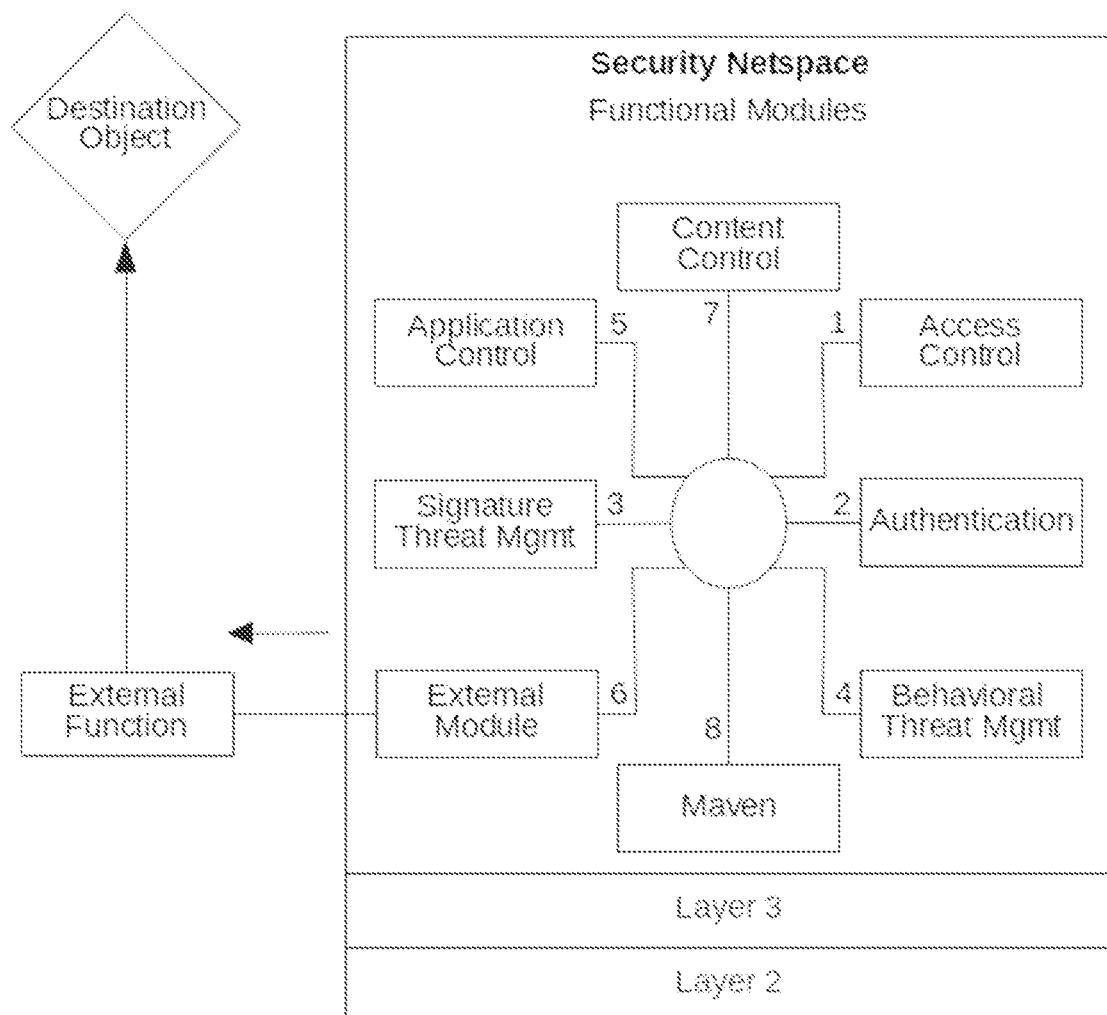
Figure 32:
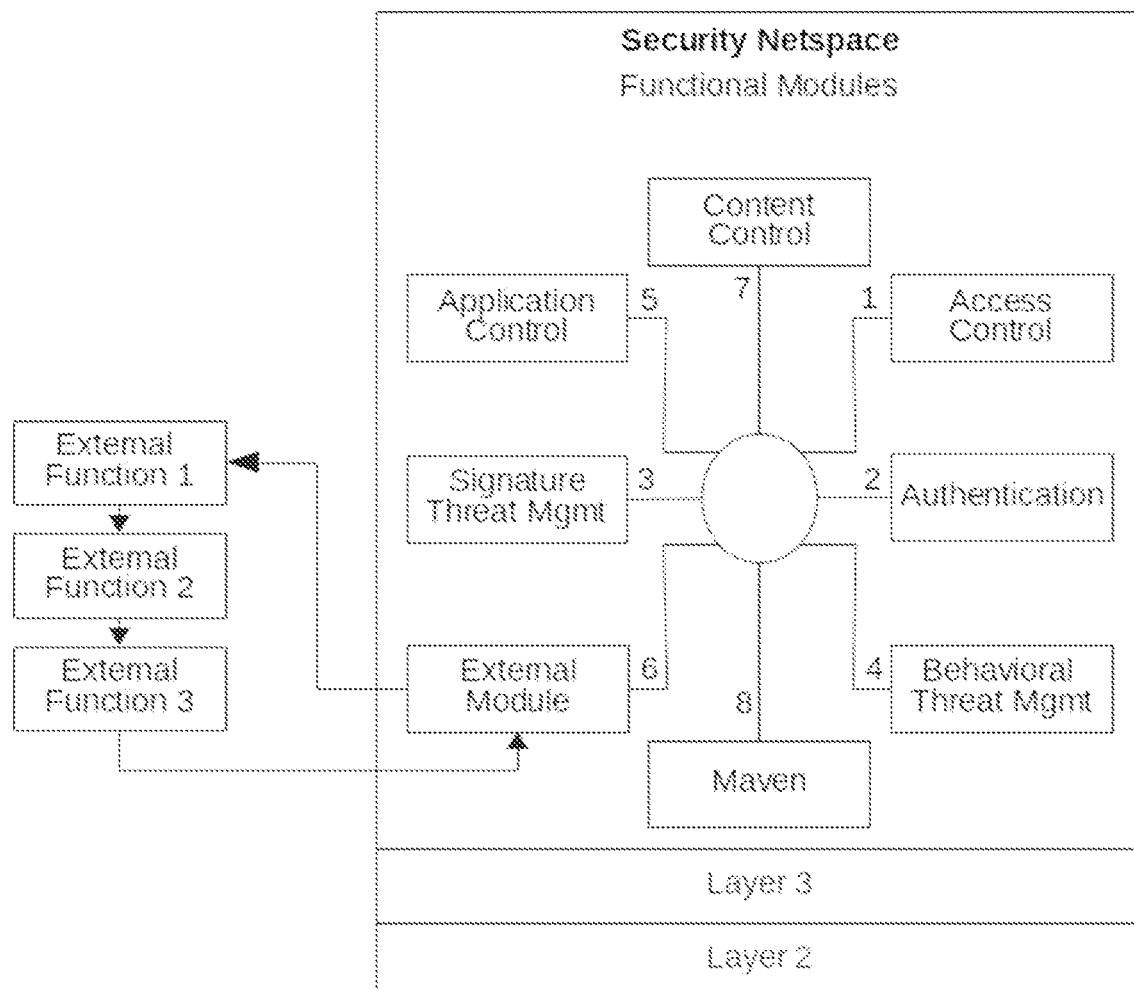

FIG. 28 depicts an embodiment of the invention where each ecosystem of the invention's multiple disparate ecosystems and all associated data operate on at least one dedicated and segregated database, where no system dependency operates on shared databases or other information stores.

FIG. 29, 30, 31, and 32 depict a capability of the present invention where at least one external module may be added that serves a function and can be queried, terminate, redirect, deliver or forward communications to the originating netspace or another destination including another netspace or another module.

Figure 33:
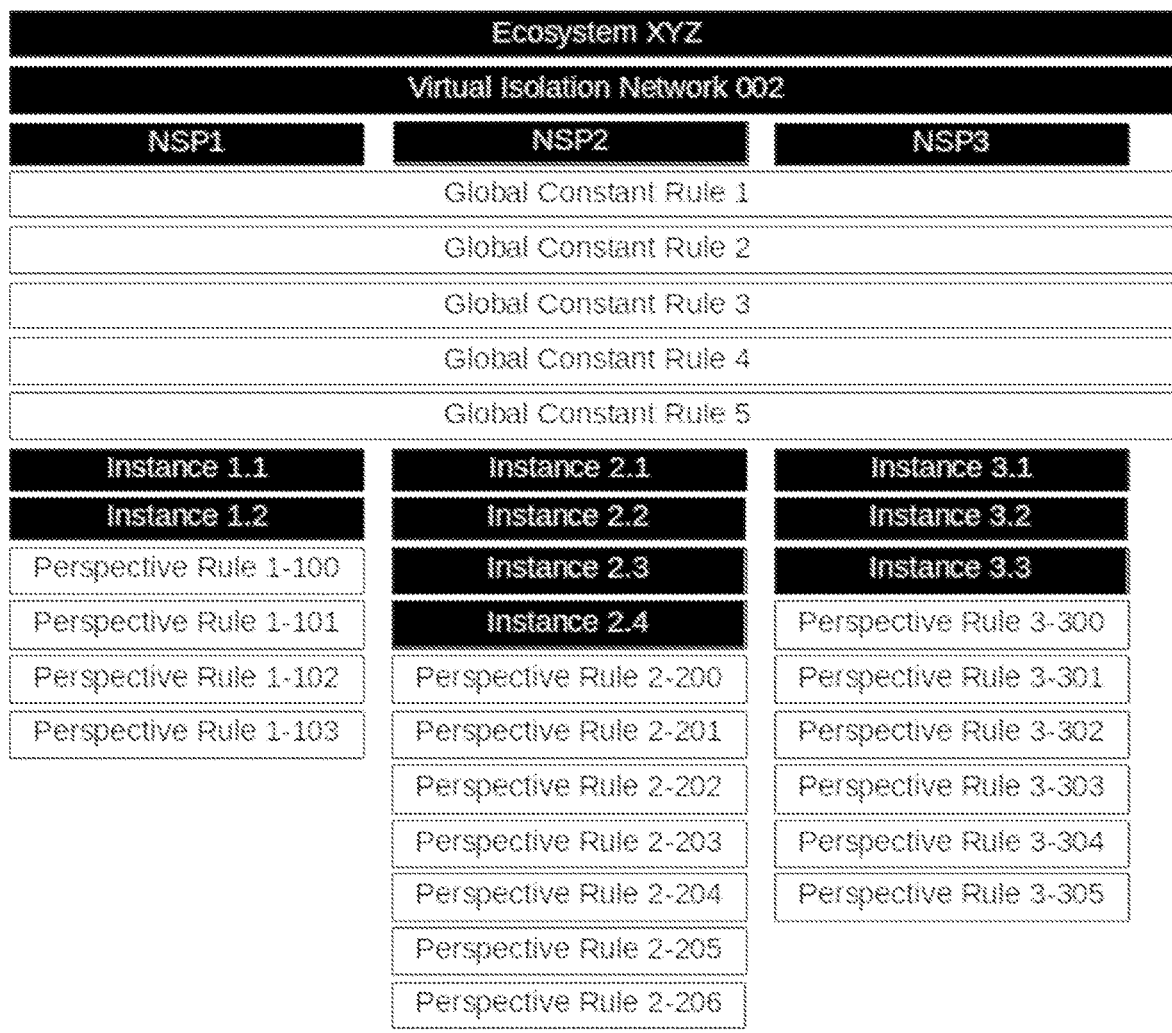
Figure 34:
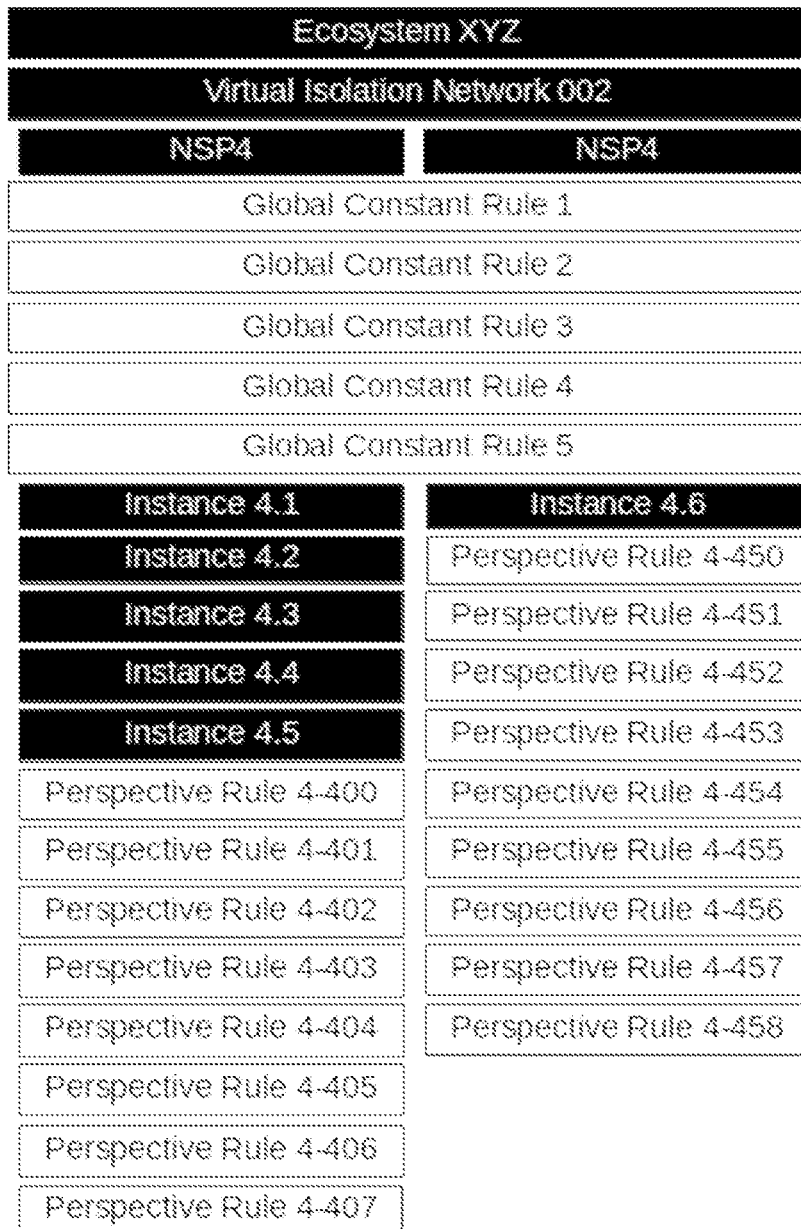

FIG. 33 and 34 depict a functional capability of the present invention, where defined policy for connectivity, network and security categories may be comprised of perspective policy type, where policy is selectively applied to a single or group of security instances, netspaces or modules operating in one or more NSPs for an ecosystem virtual isolation network. Conversely, the defined policy may be comprised of global constant policy type, where a single policy is uniformly applied to the security instances, netspaces or modules for the entire ecosystem. As demonstrated in this diagram, policy may also be comprised of a combination of perspective and global constant policy types.

Here, the ecosystem Ecosystem XYZ with virtual isolation network Virtual Isolation Network 002 span NSP1, NSP2, NSP3 and NSP4. All NSPs host a plurality of security instances. In this example, Global Constant Rule 1 through 5, which are global constant rule types, are applied across all security instances that the ecosystem virtual isolation network. All communications are subjected to the global constant rules 1 through 5 as shown. Should global constant rules 1 through 5 not apply to the communication and the communication exists at: NSP1, Security Instance 1.1 and 1.2 apply unique perspective policy Perspective Rule 1-100 through 1-103; NSP2, Security Instance 2.1 through 2.4 apply unique Perspective Rule 2-200 through 2-206; NSP3, Security Instance 3.1 through 3.3 apply unique Perspective Rule 3-300 through 3-305; and NSP4, Security Instance 4.1 through 4.5 apply unique Perspective Rule 4-400 through 4-407. Note that NSP4 also hosts security instance 4.6 where communications destined through this particular security instance will have Perspective Rule 4-450 through 4-458 applied demonstrating that a single ecosystem virtual isolation network may support multiple policy and policy types even within the same NSP.

DETAILED DESCRIPTION

The invention provides a new and unique method and system to dynamically address the many prior art challenges associated with IoT and related systems. The invention provides connectivity, network, security, identity and privacy protection for technologies that fulfill a specific function or set of functions and their related and supporting platform elements. Once identified to a particular set of known elements and defined circumstances, an identifiable ecosystem can span multiple public and or private networks and functions as an isolated and sealed network delivering per individual element security and related functionalities for the various component platform elements. Platform elements can include users, devices, hosts, systems, cloud instances, SaaS, applications, databases, networks, clouds, cloud networks, operating systems and any other component that may enjoy the benefits of the platform's functions. Through the present invention, per element security can be achieved for distributed applications and networks. Moreover, the present invention is not limited to security but also improves customer connectivity, network, identity and privacy protection services as well as policy management among other capabilities.

The ecosystem creates one or more isolated network partitions known as the virtual isolation network that may span multiple public (Internet) or private networks. The virtual isolation network does not require any special privileges to be functional on the many distributed public and or private networks it supports. It only requires that these networks have the means to communicate to the ecosystem and its components.

The virtual isolation network supports elements that either connect to it or communicate with it. For these purposes, an element includes: 1) devices, including physical hardware, computers, IoT, and mobile phones, 2) applications, 3) networks, 4) cloud instances, 5) cloud networks, 6) SaaS applications, 7) addresses, including one or more Internet Protocol addresses, fully qualified domain names (FQDN), universal resource identifiers (URI) and universal resource name (URN) and universal resource locators (URL), 8) users, 9) physical facilities, 10) operating systems, 11) virtual machines, or 12) service, e.g., network protocol, network port, icmp type and code, application protocol, application program or combination thereof. Elements may be any combination of mobile or static, distributed or together, remote or local, partitioned or unobstructed and operate as stand-alone or as a collective with all associated and attached systems. Each ecosystem registers, stores and tracks its associated elements in a segregated database and all communications internal to the ecosystem are segregated via at least encryption, physical or virtual separations.

An ecosystem may, but is not limited to, be used to support a single application platform and its relevant associated subsystems and components. For example, an ecosystem may be confined to the video surveillance and associated systems for an organization with 60 locations around the world, including all cameras, surveillance software, short-term and long-term storage, reporting, and update systems. The same organization may have another ecosystem for building access including key card readers, physical security access management application, alerting, and reporting systems.

An ecosystem may consist of one or more virtual isolation networks. Each virtual isolation network may consist of one or more security instances that exist in one or more geographically or virtually distributed network security points (NSP). To become a member of the ecosystem, elements must connect to the virtual isolation network by connecting to at least one member security instance via one or more connections. Elements may also enjoy the benefits of the invention by communicating with the virtual isolation network.

Connections are used by at least one element to become a member of the ecosystem virtual isolation network and may comprise at least one of multiple connection types, including encapsulated and dedicated connections. Connections for individual elements such as a singular device, application, operating system and cloud instance vary from group elements that include network and cloud networks connecting multiples of participants. Individual elements use the connection to integrate directly with the virtual isolation network. By individually connecting to the ecosystem virtual isolation network, elements benefit from per individual constituent connectivity, visibility, identity, privacy protection, controls and security.

An element may use a connection to become a connected member of the ecosystem, however, a non-connected element may also be an ecosystem member. Finally, an element may be a non-connected element and a non-member, that may operate on an external or public network.

Figure 2:
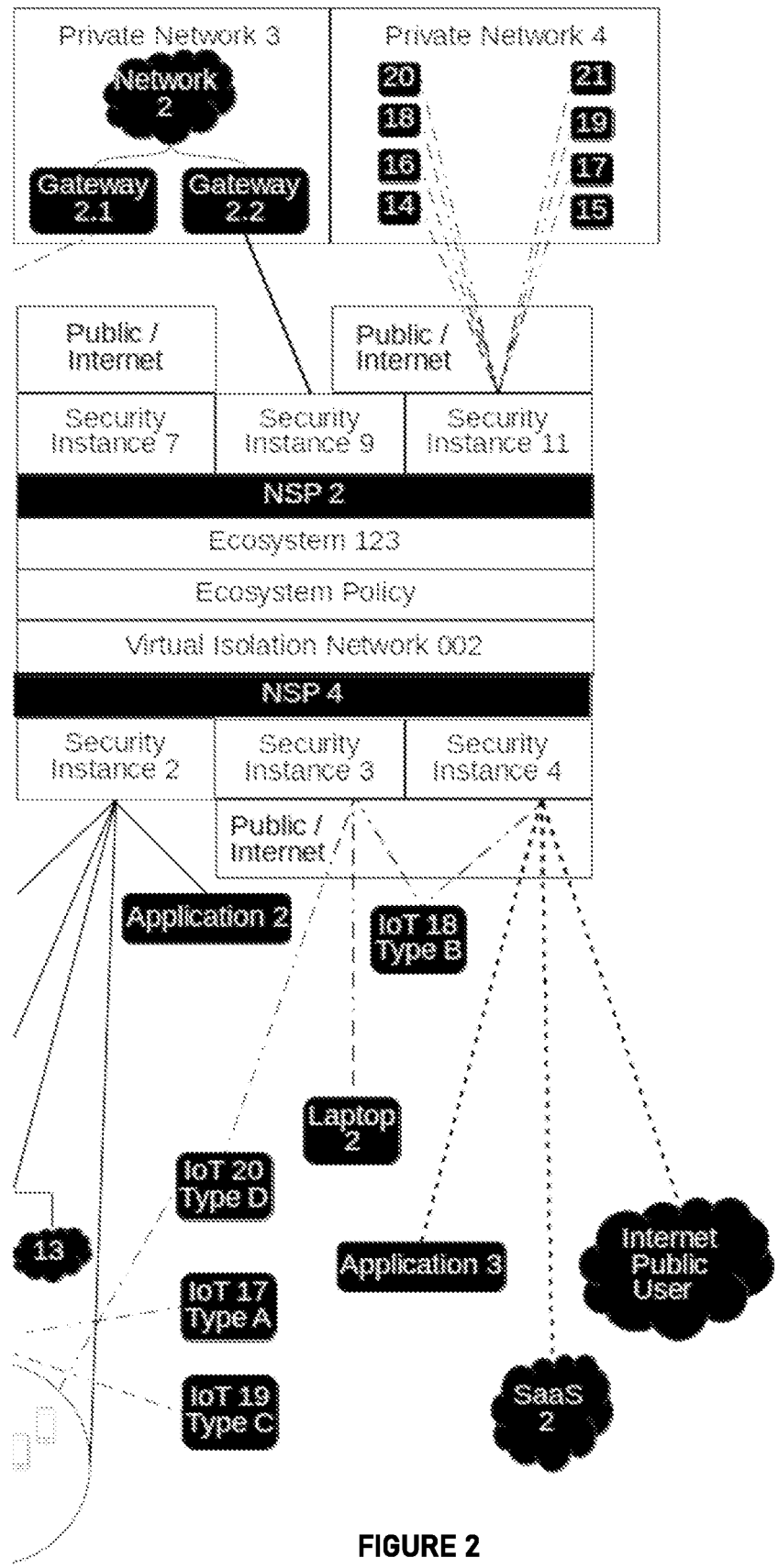

For example, as demonstrated in FIG. 2, SaaS2 and Application3 are non-connected members of the ecosystem and Internet public users are non-connected non-members. The non-connected non-member Internet public users may access the non-connected member SaaS2 and Application3 via the ecosystem.

Group elements consist of a plurality of systems sharing a common network that use at least one gateway to interface with the virtual isolation network via at least one security instance. The gateway is a common interface to the ecosystem virtual isolation network for the plurality of connected participants that make up the group element network. Gateways do not offer per individual participant security for the plurality that share at least one common gateway, but rather the entire group collective as a unit.

In the present invention, elements may connect to at least one virtual isolation network security instance via at least one encapsulated, dedicated, public connection or some combination, as depicted in FIGS. 1, 2, and 3.

An encapsulated connection type is an encrypted or non-encrypted tunnel that directs either all (full tunnel) or specified (split tunnel) communications to at least one designated security instance that functions as its virtual next hop. Both individual and group elements may use at least one full tunnel or split tunnel encapsulated connection mode to connect to at least one security instance.

Dedicated connection is at least one fixed or variable bandwidth point-to-point or point-to-multipoint private connection that functions as a private interface between at least one element and at least one security instance. Both individual and group elements may use at least one dedicated connection to connect to at least one security instance.

Public connection represents public networks such as the Internet or other networks with multiples of unknown participants without specific information exchange agreements. The virtual isolation network may, as defined by policy, interface and interact with public networks to enable the internal elements to communicate with external and public elements. Both Individual and group elements may use at least one public connection to the virtual isolation network to communicate with elements on that network.

Ecosystem virtual isolation networks may be configured to operate as a distributed isolation network that can span local area networks (LAN), wide-area networks (WAN), internal, external (Extranet) and public (Internet) networks among others. Ecosystems may also function using mobile networks, satellite networks or radio frequency networks among others. Through their connectivity with the security instance, the members of the ecosystem may securely and privately communicate with one or more of internal elements, that belong to the same ecosystem (intranet), external elements, third-party relationships with information exchange agreements (extranet) and public networks (Internet) or any combination. An ecosystem virtual isolation network fully supports securing elements that use any type of network that directly or indirectly supports TCP/IP to connect to the ecosystem virtual isolation network on a single or with multiple private and or public networks and may expand or constrict as is deemed necessary or as it may naturally and randomly occur through organic use.

Though elements may operate using one or more distributed public or private networks, upon becoming an active member of the ecosystem by connecting to an associated virtual isolation network via one or more security instances, they become isolated and inaccessible from any local or remote network ad their participants. They achieve this by communicating exclusively to the security instance and become unresponsive to any other communication request for layer 2 or layer 3 local participants and connected networks, as well as layer 3 for all connected and remote networks.

For example, as shown in FIGS. 21 and 22, which features the functionality of a preferred embodiment, the operator requires an encapsulated connection to two different ecosystem virtual isolation network security instances at two different NSPs. The first security instance with the IP address of 10.10.10.10 and the second 2001:2000:200 act as the encapsulated connections' termination points. The routing table is dynamically modified with a granular and specific next hop for each of the two security instance connection termination points, which is identified as the local network's gateway/default route IP address. The element's default route, representing the next hop for all destinations unknown to the element, is set to at least one of the encapsulated tunnels' remote IP address.

With the above defined, all communications used to build and maintain the encapsulated connection specifically to the ecosystem virtual isolation network security instances are sent via the local network's gateway. All other communications are sent via at least one of the element's encapsulated tunnels.

A sample routing table is prepared as follows:

```
default (0.0.0.0/0) via 2.2.2.1 (Remote Ecosystem Security Instance 1) IPv4
default (::/0) via 8888:9999::1 (Remote Ecosystem Security Instance 2) IPv6
10.10.10.10/32 via 77.77.77.1 (Local Network Gateway) IPv4
2001:2000::200/128 via AAAA:BBBB::1 (Local Network Gateway) IPv6
```

Upon successfully establishing the connection, Layer 2 MAC address to IP address resolution or neighbor discovery methods such as ARP in IPv4 and NDP in IPv6 are disabled and the element uses the stored information acquired. The element remains unresponsive and unreceptive to any other communication either initiated or received to and from devices on the local or remote networks. This means the element, though operating on an untrusted private or public network, is now a member of the sealed or isolated ecosystem virtual isolation network and no extraneous devices or systems outside of systems accessible with the ecosystem virtual isolation network as defined by the operator may communicate with the element.

A network security point (NSP) is a facility that hosts at least one security instance and may be physical, virtual or combination thereof. The NSP provides the network, compute and storage that powers one or more security instances to provide one or more virtual isolation network services for one or more disparate ecosystems. An NSP supports multiple ecosystems that each may have multiple virtual isolation networks that are comprised of multiple security instances. Multiple security instances for the same virtual isolation network and ecosystem may exist and be simultaneously active and operational in multiple geographically or virtually distributed NSPs.

This capability to support multiple NSPs and security instances is intended to facilitate high availability and diversity, scalability, performance and an optimized experience for elements. High availability and diversity, where in the event of a complete or partial NSP outage in one or more regions, one or more other NSPs hosting one or more simultaneously active security instances, all of which share the same policy, that are operating in unaffected regions, may service the commitments of the impacted NSPs, in real-time and without an automated or manual failover event. That is, the communications for impacted NSPs are dynamically and actively supported without the need for a system or operator to recognize an outage event has occurred and take some action to address the outage so that impacted elements may resume their normal functions.

It is industry recognized and accepted that any single geographic region does not have the capacity to support infrastructure workload beyond certain thresholds. Though the thresholds may vary from region to region, they all have their limits. Infrastructure threshold limits include availability of data center facilities and space, affordable and reliable power in the capacities required, diverse fiber optic paths and right of way, bandwidth and well connected networks among others. Diversification across many regions enables the capacity requirements to be globally and geographically scattered, whereas the infrastructure limitations of any single region do not impact the availability or scalability of the platform. The ecosystem virtual isolation network scales to dynamically add or remove multiple simultaneously active NSPs, enabling workload capacity increase or decrease, in multiple regions, while reducing the impact of the regional infrastructure and resource variances and limitations for each NSP.

Where an NSP that is located geographically or electronically (lower number of hops, autonomous systems or other factors) closer to the element base it services, represents a more optimized experience. For example, an NSP in New York that services elements in the contiguous United States and Japan may offer a better experience for elements located in the contiguous United States than in Japan, by virtue of the geographic, network (i.e. optical network kilometers) and Autonomous System distance that the communication must be travel to reach the NSP. At the contiguous United States' most distant point, latency from Los Angeles to New York averages sub 70 ms. Conversely, latency from Tokyo to the New York averages 220 ms and sometimes more. The communication from Tokyo to New York is also less consistent due to the limited number of paths and potential periods of network saturation. Servicing elements in Japan by an NSP in the Asia Pacific region that could include Japan, Singapore and Hong Kong among others, provides the elements in that region a shorter, faster and more reliable path to the NSP via the use of regional peering networks. Regional peering networks allow global and regional Internet Service Providers (ISPs) to service regional communications locally. A sampling of such regional peering networks include: 1) NYIIX—US Northeast coast 2) TIE—US Southeast coast 3) LAIIX—for the US West coast 4) LINX—Western Europe and 5) AMS-IX—Central and Eastern Europe, to name a few among the many that operate globally.

Multiple security instances that belong to the same ecosystem virtual isolation network may exist in the same NSP, in multiple NSPs or both. Security instances are comprised of multiple components that include netspaces, within which service modules operate to provide a specified functionality such as layer 2 and layer 3 networking; tunneling and dedicated connectivity; access, application and content controls; threat management; privacy and encryption; and address translation among others. A security instance may exist as a component that is a member of one virtual isolation network.

As depicted in FIG. 5, the security instance comprises at least one netspace (also referred to as "segregated virtual network unit") which is a segregated virtual network, functionality and compute unit that utilizes a shared physical or virtual host kernel, with a fully contained dedicated Layer 2-7 network stack and ability to host applications specially configured to operate in the netspace. The netspace interoperates with other netspaces and or elements using at least one or combination of physical, virtual, or interconnect network interfaces. A security instance comprises at least one and often more netspaces that are connected together via one or more interconnect network interfaces. Netspaces may be configured to facilitate a variety of functionalities via one or more modules, as may be needed to meet the security instance's specified tasks. Each netspace may be functionally outfitted with a specific combination of the necessary interfaces and modules that use one or more applications to provide specific functionality and flow.

As depicted in FIG. 8, the netspace physical network interface is dedicated and exclusively services a single netspace. It is terminated within that netspace and is not available or even visible to other netspaces within the security instance.

A virtual network interface on the other hand is a physical network interface that is available to be shared across multiple netspaces within the same security instance. The virtual network interface may be a cloned physical network interface that may be used across multiple netspaces. It may also be a partitioned physical network interface, where one or more partitions may be committed to specific netspaces within the same security instance. For example, if multiple netspaces need access to the public Internet network, they can each use a virtual clone of a physical network interface for each of the netspaces that require it. In another example, two different netspaces use different partitions of the same physical network interface. Netspace 1 could be assigned partition 11 and Netspace 2 could be assigned partition 12 of physical network interface 33 (not depicted). Cloned and partitioned virtual network interface types may be utilized in combined form.

As demonstrated in FIG. 6, interconnect interfaces serve as a connection between netspaces. An internal interconnect interface serves as a connection between two netspaces that exist within the same security instance. An external interconnect interface serves as a connection between two disparate netspaces that exist in different security instances, serving to connect the security instances and thereby expanding the coverage of the ecosystem virtual isolation network. The external interconnect interface may be used to either extend the virtual isolation network and its associated ecosystem to another NSP or to expand the virtual isolation network within the same NSP, or both. Expanding the virtual isolation network to another NSP may provide high-availability (resiliency), increased performance and scalability as well as providing a more localized and optimized experience for the same reasons defined above. Increasing the number of security instances for a virtual isolation network within the same NSP provides higher availability by allowing multiple iterations of the ecosystem virtual isolation network security instances to exist, where in the event of an outage of one security instance, the ecosystem virtual isolation network will remain available and functional in that NSP. Increased performance and scalability where, as required by the operator, additional security instances can support an increase in the number of member elements or associated workload, thereby preventing overload or outage situations that may impact availability or functionality. The number of security instances that may be required vary depending on the number of elements, the workload impact of the elements on the security instance and geographic or electronic proximity of the elements to the security instance. Interconnects may be dynamically established to facilitate a variety of flow models that are needed as required.

As the number of security instances that make up the ecosystem virtual isolation network increases, especially when those security instances span multiple NSPs, the number of external interconnects that attach the multiple security instances together to make up the ecosystem virtual isolation network may grow to be overly large and ponderous. At some threshold, the complexity of creating and maintaining a mesh (FIGS. 1, 2, and 3) of external interconnects may be inefficient and consume more resources than necessary. When a specified threshold of external interconnects is realized for an ecosystem virtual isolation network operating in an NSP, one security instance may be designated as an interconnect primary and optionally another security instance as interconnect secondary for the ecosystem virtual isolation network at that NSP, where all security instances within the local NSP connect to the interconnect primary and secondary and use them as a conduit to all other security instances. The interconnect primary and secondary designations are assigned per NSP and both the interconnect primary and secondary systems are active and serve to connect their constituent security instances within their home NSP to one another as well as connecting them to other security instances at remote NSPs. As demonstrated in FIG. 7, the interconnect primary and secondary at each NSP build external interconnects to other security instances at other NSPs where if an NSP does not host an adequate number of security instances to justify their use, the external interconnect will be established to each security instance at the NSP; or if their use is justified, they will establish an external interconnect to other interconnect primary and secondary security instances at remote NSPs. This method is used to simplify and reduce the complexity and number of external interconnects between the various security instances, while facilitating the external interconnect mesh as more security instances are added to the ecosystem virtual isolation network.

While one or more netspaces comprise the security instance, each netspace hosts at least one module which provides at least one functionality. There are two types of modules. In-line modules that operate in the flow of select communications and on-demand modules that provide services that may be called upon when needed. For example, the Access Control module where one or more packets of the communication must flow through the designated module for the access control function to ensure adherence to the defined policy is in-line. Alternatively, a function such as authentication provided by the Identity module, where there is a one-off query for identity validation and where the communication does not need to flow through the module is on-demand. Both may be used to satisfy the requirements of a single rule. In the case of access control, it operates in-line to implement controls based on source, destination, protocols and other attributes of the communication. The same rule may require a one-time, on-demand query to the identity module to authenticate the user or other element. The services and functionality provided by a single module may classify it as both in-line and on-demand.

Netspace modules may include services such as layer 2 switching and layer 3 routing; address translation; encapsulation and VPN; access, application and content controls; application delivery and load-balancing; threat management; and acceleration among others. The modularity of this invention also provides the ability to introduce new and different service modules to evolve with industry requirements and threat landscape.

As represented by FIG. 4, an entire ecosystem in the current and planned embodiments uses a single policy that defines the behavior of the ecosystem and all associated components. A single ecosystem policy defines the attributes of the ecosystem and associated virtual isolation networks, and the number, type and location of security instances, including the NSPs they operate from.

The policy is comprised of four policy categories that include connectivity policy, network policy, security policy and profile policy categories. The policy categories, collectively herein known as "policy", correlate to the different functional capabilities of the invention. The operator uses individual policy rules to define various connectivity, network, security and profile policy. As outlined in FIGS. 23, 24 and 25, the policy comprises policy rules that are comprised of mandatory triggers and actions as well as optional validators. Validators apply at least one optional service module function to the triggered object of a policy rule. The policy applies to the entire ecosystem across all NSPs, virtual isolation networks, security instances, modules and interfaces.

The policy rule trigger is configured to identify at least one attribute to determine applicability of the rule to its defined function. Attributes may vary between the policy categories. For example, connectivity may trigger on certificate, device id, NSP, entry netspace, interface and IP; whereas network may trigger on specified security instance, netspace and interface; and security could trigger on communication attributes such as: entry or exit netspace, source/destination IP addresses—both individually or in combination, user or other element identity, type, source/destination geography combinations, device identifier, network protocol and port/type|code etc., application protocol, application program, payload content, file type and content category among others. Some external attributes may also be used as triggers. These external attributes may include time-of-day/schedule/season, geolocation as well as threat or other index types. Each policy rule is designated a unique Identifier as demonstrated in FIGS. 10 and 11, under the policy rule id heading.

The first policy rule with a successful trigger match then applies its associated action, that is used to perform at least one act on the object of the trigger match. In each policy category of connectivity, networking or security an action may be performed such as to allow or disallow a connection and specify associated connection attributes and limits (connectivity), assign a layer 2 and layer 3 attribute to a netspace and its associated interfaces (network), or allow, deny or redirect (to forward the communication to another policy rule or set of policy rules) the communication (security). For example, as demonstrated in FIG. 10, if a communication source is a device whose identifier is in group IOT-G-1029 and the specified device type is a Medical Device and it is attempting to initiate a communication using TCP port 8821 with the HTTP protocol and MedIoT application program, then allow it. A security policy, policy rule action could include simple allow, drop (no external notification of rejection) or deny (with notification of rejection) as well as multi-part actions such as Allow & Log, Drop & Alert or Deny & Alert & Log, where the simple action is augmented by at least one additional action. Multi-part actions may also incorporate more complex actions where if triggered, the object of the rule is forwarded to another policy rule or an associated group of policy rules for further action, where each is similar to the policy model defined here.

At least one optional validator may be assigned to provide at least one supplemental service when enabled in a policy rule that may be applied to the triggered subject. For example, content control url and threat management validators (not depicted) may be enabled for a simple security policy rule that triggers if the communication is sourced from the Internet and destined to a specific server identified by its IPv4/v6 address, only for TCP port 80 and only if using the application program Git. All other communication types and programs will be denied. The communication matching the trigger will be directed to a threat management module, to determine if the allowed communication is malicious, and a content control module to assess if the communication content adheres to content standards defined by the operator. The configuration for content control url and threat management validator modules is defined in at least one profile policy each. A single profile policy for a validator may be utilized by multiple different policy rules where the validator is enabled; conversely, each policy rule where the validator is enabled may also utilize different validator profile policy or any combination thereof. As another example, a content control module can have a profile policy identified as ContentControlProfile-1, (not depicted) which is configured to prevent access to any content categorized as illegal drugs. A second content profile policy identified as ContentControlProfile-2, which is configured to prevent access to any content categorized as Adult (explicit content) and a third, ContentControlProfile-3, which is configured to prevent access to any content categorized as hacking tools. In this example, Policy 1 has the content control module enabled with ContentControlProfile-1 profile. Policy 7 has the content control module enabled with ContentControlProfile-2 profile and Policy 12 has the content control module enabled with ContentControlProfile-3 profile.

As demonstrated in FIG. 18, each profile policy is comprised of at least one, and often many multiples of violation scenarios that each is comprised of a trigger, action and or action value score that may be invoked should the violation scenario be triggered. The triggered object of a policy rule is examined by all violation scenarios in an assigned profile policy either until 1) it has been exposed to all violation scenarios without triggering any of them; 2) it has been exposed to all violation scenarios and triggered violation scenarios with non-terminating actions such as alert only; or 3) such point as the associated action for a violation scenario applies an impactful action that immediately stops the violation scenario check before they are completed. Impactful violation scenario actions could include some combination of alert, allow, drop, deny, client-side reset, server-side reset, reset of both client-side and server-side, redirect to at least one informational URL (Universal Resource Locator), or intercept with authentication among other capabilities.

The flow profile policy as depicted in FIGS. 12, 13, and 14 provides the capability for the invention to define a unique use of service modules and flows based on a variety of factors. The flow profile policy specifies the netspaces to be enabled, the sequence the netspaces are to be used as well as the designated modules for each netspace to be enabled and the sequence in which the enabled modules process the communication. Once a specific policy rule is triggered, a flow marker may be injected, in much the same manner as VLAN (Virtual Local Area Network) or MPLS (Multiprotocol Label Switching) tags are injected into data packet streams. As demonstrated in FIG. 9, the flow marker references a flow profile policy as would be understood by those skilled in the art. The initiating, as well as all subsequent packets for that communication are tagged with the same flow marker to ensure consistency in processing and handling of the communication. The presence of the flow marker notifies each netspace and associated modules how the communication should be processed. The flow marker is a unique designation that references if and in what sequence a communication should flow through, query and or be processed by specified netspaces and their associated modules. Upon exit from the security instance, the flow marker is removed to ensure adherence with industry communication standards. An operator may define multiple flow profile policies for any individual security instance or multiple complementary flow profile policies at multiple security instances the communication may or is designated to be processed.

The flow policy sequence iteration may be configured as either serial method as depicted in FIGS. 12, 13, 14, and 19, where a single module is assigned a specific and unique flow value such as flow sequence 1 is module 1, flow sequence 2 is module 2 and flow sequence 3 is module 3 and so on; or it may be configured as parallel method, as depicted in FIGS. 15, 16, 17, and 20, where a replicated copy of the communication is simultaneously forwarded to multiple modules such as flow sequence1 is modules 1, 2, 3, and 4; or defined as a combination of serial and parallel, such as flow sequence 1 is module 1, flow sequence 2 is module 2 and flow sequence 3 is modules 3, 4, 5 and 6. A single flow profile policy may comprise a combination of serial and parallel flow policy sequence iteration method. Each enabled module within the flow profile policy is designated a corresponding profile policy that defines how the module acts upon the communication.

Along with the flow profile policy that specifies a flow sequence, a response method may also be specified. The response method determines the criteria for the policy rule action or profile policy to be implemented. The response method could be one of veto or consensus methods. The veto response method specifies that if any module in the flow responds with an impactful action, the action is immediately implemented on the object of the policy rule.

As demonstrated in FIGS. 13, 14, 16, and 17, with either the consensus response method, a violation threshold known as an action score threshold is defined in the flow profile policy. Each profile policy violation scenario is designated at least one action value. As the object of the policy rule is processed by the various validator modules, if a violation scenario is triggered, the action value score for the violation scenario is applied. An action value score of 0 is assigned if no violations were detected or the prespecified action value score if a violation was detected by the module. As the modules process the communication, the action value score is sent in real-time to a special module known as the maven module. The maven module tallies the scores for both serial and parallel flow sequences and if at any point the cumulative score, known as the maven score, matches or exceeds the action score threshold, then the specified corresponding maven action defined in the flow profile policy is executed, as depicted in FIGS. 14 and 17. The maven action may be configured as any of the known defined actions in this invention. It is possible for the action scores to accumulate to allow, duplicate, intercept, redirect, log or alert/notify the communication as much as it may be used to disable or reset the communication.

Connectivity policy defines how an element or a group of elements connect to at least one virtual isolation network via a connection to at least one security instance. Connectivity policy specifies which individual or group of elements can connect via a specified connection type, such as encapsulated or dedicated connection, and connection mode, such as full or split tunnel. It also specifies at least one NSP and security instance for the connection as well as blackout schedules among others. Along with this information, the connectivity policy defines tunneling specifications such as per device or gateway connections, tunneling or dedicated connection types and their associated attributes required to facilitate connecting and integration of the element into the virtual isolation network. These include encapsulation certificates such as X.509, connectivity configurations and layer 3 routing among others. The connectivity policy adheres to the trigger, action and validator policy construct already defined.

The network policy defines how netspaces, modules and associated applications communicate between sources and destinations for layer 2 and layer 3 communications with a variety of perspectives, as depicted in FIGS. 26 and 27, including internal, external (extranet) and public (Internet). The network policy category is used to implement unique perspective-based layer 2 and layer 3 parameters per netspace to be used by member security instances that makes up the virtual isolation network.

The layer 2 policy for each netspace, also referred to as ns-switch, defines the configuration for the layer 2 forwarding tables including ARP and NDP, while the associated configuration for Layer 2, referred to as ns-switch behavior defines specific configuration for the ns-switch features. These could include configuration for 802.1q VLANs, 802.3ad interface bonding, spanning tree and logical link discovery protocol (LLDP) among others. ns-switch behavior also specifies network layer controls such as MAC (Media Access Control) static assignments, MAC limiting, MAC addresses or organizationally unique identifiers (OUI) controls and storm control features among others.

The layer 3 policy, referred to as ns-router, defines the configuration for the layer 3 forwarding table as well as the layer 3 associated behaviors, known as ns-router behavior. The layer 3 forwarding table provides next-hop association for known and unknown networks to create a routing table. The ns-router behavior configuration specifies routing protocol defining the behavior of routing protocols such as eBGP (External Border Gateway Protocol), iBGP (Internal Border Gateway Protocol), OSPF (Open Shortest Path First), RIP (Routing Information Protocol), and IS-IS (Intermediate System-Intermediate System) among others; as well as Policy Based Routing (PBR), as well as route control and flow direction, thresholds and associated interfaces. The network policy adheres to the trigger, action and validator policy model already defined.

The security policy defines configuration for security instances, netspaces and modules, and is used to determine if communications between at least one element and another internal, external or public element meets the security standards as defined by the operator. Security policy may define configuration for various functions that may include: 1) access, application and content controls, 2) signature and behavioral threat management, 3) application delivery and load-balancing, 4) in-line decryption and re-encryption for security scans of encrypted communications, 5) threshold based controls and 6) user and device identity and authentication, 7) external index, 8) compliance, and 9) visibility and insight. These various functions will guide the operator to selectively apply security policy to a specific or group of security instances. As an embodiment of the invention, policy was configured to be so selectively applied to a specific or group of security instances, netspaces or modules referred to as the perspective policy type.

Conversely, a single policy may be applied consistently across all distributed security instances, netspaces or modules throughout the ecosystem that is known as global constant policy type. Perspective and global constant policy (herein known as "policy types") may also be used in combination for any of connectivity, network and security policy categories. Moreover, as demonstrated in FIGS. 33 and 34, the combination may be ordered where the global constant policy is applied first followed by the perspective policy. For example, in the midst of a malware outbreak, the operator may define some policy rules specifically designed to protect the element base from the outbreak as global constant policy rules first to apply consistent protection for the entire ecosystem, followed by the perspective policy. It should be noted that an entire policy may comprise perspective policy only or global constant policy only as required by the operator.

As another example, an organization uses many multiple elements throughout their global infrastructure. However, they have strict compliance requirements that vary between geographies, industries and even specific device types. Compliance standards could include Gramm-Leach-Bliley Act (GLBA) for one set of elements based in their New York offices and FDA compliance for distributed elements throughout the U.S., and General Data Protection Regulation (GDPR) for the EU-based elements. The organization benefits from both global constant and perspective policy types with the capability to tune their policy to implement a uniform global constant cyber-security policy ecosystem-wide, and specific perspective policy for granular isolation and privacy protection required for the specified elements to adhere to the respective GLBA, FDA and GDPR standards. The ecosystem provides single policy for a single globally distributed security infrastructure that addresses both compliance and cybersecurity protection for the various ecosystems they rely on.

The policy rule trigger enables granularity to select specific elements by any combination of individual or groups name, as well as type (i.e., medical equipment), industry, geography, source, destination or communications path (controlled by limiting specific communications to specified NSPs) including source and destination security instance(s), netspace(s), interface(s) along with operator industry and geography. The policy rule trigger may also use external factors such as time-of-day/schedule/season, geolocation, or threat index or other types of indices.

The present invention provides a single security policy across all distributed technology silos such as IoT, devices, clouds, SaaS, mobile, remote users, offices and data centers. This invention utilizes a single simple policy that connects and secures the entire application environment regardless of the type or physical distribution of the element. A single simple interface that fulfills element management, identity, connectivity, network and security, offers a dramatic advantage in improving agility and security effectiveness. The modular nature of this invention also enables it to evolve and adapt as new capabilities are added and removed as may be required. Even with the addition of new functionalities and capabilities over time, the system continues to retain its single simple security and single simple policy management capabilities.

Each member of the ecosystem, be it an individual device or a network of devices, systems and or applications, receives uniform and consistent security regardless of the element's size, capacity, resources and capability and regardless of the network they operate on. Furthermore, the security challenges for on-device security that are limited by on-device capacity, capability and resources such as processor, memory, storage, network bandwidth or availability of technologies to enable fully functional security, are addressed by the use of ecosystems and virtual isolation networks and off-device processing of security. For example, in order to deliver fully functional security; identity, access and content controls; threat management and privacy protection are required at a minimum. In the present invention, each ecosystem element including IoT and other elements are no longer susceptible to resource, technology availability or security challenges. Each element benefits from the ecosystem's enhanced functional, resource, computing and capacity powers that may span multiple technologies, technology types, systems, platforms, networks and data centers among others. Moreover, modification and implementation of policy is done centrally and applied globally across all distributed member elements, without the need to interface with or modify the elements directly.

Along with significant simplification by the convergence of the many disparate policies into a single simple policy, this invention automatically associates and tracks elements and policy. As an element or its associations such as a system, application, device or address is disabled or deleted, the associated rules, policy and elements are dynamically disabled or deleted as designated by the operator. The same applies to the security instances, virtual isolation networks and ecosystems. As any of these are disabled or deleted, their associations, if not active within the ecosystem, security instances, policy or elements are dynamically disabled, deleted or expire as designated by the operator. This auto-pruning process addresses a prior art industry challenge of managing many policies across many technologies as well as straggler policies from decommissioned applications and systems.

For example, in the present invention, when an operator disables an ecosystem, all virtual isolation networks, security instances, elements, and policy will also be disabled. No special action is required by the operator. The platform automatically and dynamically prunes all associated policy and elements until they are re-enabled. If deleted, the ecosystem and all of its associations are permanently and forensically deleted. As with the above provided example, if the organization's video surveillance system is deleted, the building access ecosystem is not impacted and persists.

Each unique element, policy or any other unique component that may be defined in the invention may be designated an associated expiry. Expiry determines the schedule when the element's status is no longer valid.

Upon expiration, the unique component may be specified to become immediately disabled or remain functional with ongoing notifications until its status is updated by the operator. The present invention also enables the operator to manually or automatically renew elements with an expiry date, or to force an early expiration as desired.

In an embodiment, for example, one designated policy rule is assigned a hard expiry on Jun. 1, 2020 at 12:01 am. The expiry may be configured to provide notice at monthly intervals six month prior, weekly one month prior and daily one week prior to the expiry event. When the expiry date and time has been satisfied, the policy rule will be disabled pending renewal or deletion of the policy. Alternatively, with a soft expiry, the policy rule may retain its expired status along with ongoing notifications and is not disabled while awaiting operator status update.

As the dynamic business and threat landscape evolves, it may be necessary to introduce new functionalities to this invention to adapt or proactively preempt emerging requirements or risks. This invention is capable of adding new modular functionalities as in-line, on-demand or combined modules. These may be integrated as new modules that become part of a netspace in a security instance or as demonstrated in FIGS. 29, 30, 31, and 32, as external modules that are connected to a specified netspace. For example, external modules may become necessary if additional resources beyond the reasonable capacity and capabilities of a security instance are necessary, the module may be configured to operate external to the netspace. At this point the designated flow profile policy may be configured to direct in-line communications or on-demand queries to an external module. Flows may: 1) direct the flow to an external module where it is processed and returned back to the security instance netspace for further processing or delivery. If consensus response method is defined, the external module will update the appropriate maven module, or 2) direct the flow to an external module where it is processed and terminated; or 3) direct the flow to an external module where it is processed and forwarded to some destination directly, or 4) direct the flow to an external module where it is processed and forwarded to another external module, where it will be further processed and sent to yet another external module, back to the security instance netspace where it sourced, is terminated, or forwarded to another external destination, or any combination.

As demonstrated in FIGS. 29, 30, 31, and 32, the ecosystem supports a plurality of flows between internal, external and public networks or any combination. If allowed by the defined policy, the flows could include: 1) internal-to-internal flows, where individual elements that both belong to the same ecosystem can benefit from the functionalities provided by this invention; 2) internal-to-external and external-to-internal flows, where an internal element can communicate to a known third-party such as a vendor or vice versa; 3) internal-to-public and public-to-internal, where internal elements can communicate to public networks such as the Internet and vice versa; 4) external-to-external, where an external element may communicate to another external element; 5) external-to-public and public-to-external, where an external element can communicate to a public element and vice versa; and 6) public-to-public, where the system can offer its protections for communication between two systems that exist on public networks.

As an embodiment, this invention delivers multiple functional connectivity capabilities including on a per-device or shared gateway basis, via methods such as encapsulated and dedicated connections via public and or private networks, herein known as "connectivity capabilities". Network capabilities including layer 2 and layer 3 functions including switching, interface bonding, vlans, spanning tree among others; routing with capabilities such as routing protocols including eBGP, iBGP, OSPF, RIP, IS-IS as well as policy based routing, herein known as "network capabilities". Security capabilities such as access control, where various communications attributes including network protocol, port, code and type, as well as application protocol are used to determine element access; application program control, where the application program (Microsoft OUTLOOK™, Google GMAIL™, Oracle DB™) is used to determine element communication distribution and access; threshold controls, where controls are implemented based on specific high and low threshold assignments; content control, including URL (uniform resource locator) categorization, data pattern control and data leak prevention (DLP); threat management including signature and behavioral threat protection capabilities; on-the-fly decryption scanning and re-encryption of encrypted communications to ensure the content adheres to the integrity and intent standards defined by the policy; as well as identity and authentication, to enable and establish access as well as record the source and or destination of communications be it technology, a person or both; privacy protection, ensuring that communications over the many public and private networks remain inaccessible to all but those who need access to them; compliance, to contain and limit communications by a variety of attributes such as elements, regions, industry and validate integrity standards, privacy and record retention of communications, identities, events and other requirements for an entire, select part or specified elements of at least one ecosystem; and visibility and insight, where a variety of information relating to utilization, events, usage and behavior for functional capabilities including connectivity, network, access, application, content, threats, decrypt, identity and authentication, privacy and compliance are offered in a variety of ways, here in known as "security capabilities".

The demand of resources from a connected element includes processor, memory, storage and network resources that are required for the element to establish an encapsulated and or dedicated connection to the virtual isolation network known as connectivity resource requirements. For a connected element to enjoy the benefits of this invention's network capabilities, the resource requirements are limited to connectivity resource requirements and no more. For a connected element to enjoy the benefits of security, be it a simple access control or the entire breadth of the invention's security capabilities, the resource requirements remain limited to the connectivity resource requirements or only the resources required for the element to connect to the virtual isolation network. For a connected element to benefit from the full array of connectivity, network and security capabilities of the invention, the resources required remain limited to the connectivity resource requirements.

The demand of resources from a non-connected element that operates on any non-internal network (i.e., public or external) includes the processor, memory, storage and network resources that are required for the element to use its current networking means to communicate with an ecosystem virtual isolation network security instance, known as communication resource requirements. For a non-connected element to enjoy the benefits of this invention's network capabilities, the resource requirements are limited to communication resource requirements. For a non-connected element to enjoy the benefits of security capabilities, the resource requirements remain limited to the communication resource requirements. For a non-connected element to benefit from all connectivity, network and security capabilities of the invention, the resources required remain limited to the communication resource requirements. As such, the invention benefits from resource metering, for both connected and non-connected elements, that is inherent to and an integrated part of the system's architecture and methods.

There are multiple areas that can be monitored and quantified by various indexes, including cyber-threat, geopolitical threats as well as various utilization models among others. The various indexes could be categorized by geography, industry, political party and religion among others. This invention may accept input from indexes as part of its trigger criteria for policy rule or violation scenarios. For example, a policy rule can specify via its external section that if a source is x, destination is y and the application z, and the cyber-threat score for the North American continent is above 50, then implement the associated policy rule action. Along these lines, if the said cyber-threat index is above 50, specific violation scenarios may be enabled within specified policy profiles.

As shown in FIG. 28, the ecosystem tracks all elements, attributes, policy, flows, configurations, unique identifiers, and states, as well as any other information relating to the ecosystem in a separate, segregated, and dedicated database per ecosystem to not only provide isolation of communications between elements, but also isolation of all data relating to the ecosystem.

This invention eliminates the requirement to constantly and perpetually introduce new technologies and does not make any special demand of those who use and enjoy the benefits of it. All updates, upgrades, and new and enhanced features may be fully implemented and tested, at which point the policy may be modified for some or all communication types to transparently and painlessly benefit from the enhancements.

The modular services capabilities, modular and configurable communication flows, uniform and consistent security for all distributed or localized technology types, as well as the single simple centralized policy enables this invention to be sustained over many technology refresh cycles and evolve on an ongoing basis without the burdens of prior art technologies.

The process for an operator to configure and benefit from the use of this invention includes:
1. The process of enabling and utilizing the ecosystem requires the operator to define an ecosystem name and other descriptive attributes. This name is registered with the new ecosystem database and designated a unique identifier.
2. The operator then defines a virtual isolation network name and other descriptive attributes which is then registered to the already defined parent ecosystem database and designated a unique identifier.
3. The operator then defines at least two elements which are registered to the defined parent virtual isolation network, registered with the ecosystem database and designated unique identifiers.
4. The operator may optionally define at least one security instance construct where netspaces and modules per netspace are identified and registered.
5. The operator defines policy that include connectivity, network, security and profile policy categories as well as perspective or global constant policy types. This information is registered to the ecosystem where it is processed to generate specifications for designated modules, netspaces and security instances with the required functional service modules, network, security, profiles, and flow configurations along with NSP assignments where the security instance(s) will be activated.
6. The ecosystem also generates configurations for the defined elements if required that are made available for one-time install.
7. The element connects to the security instance, does an initial registration with the instance and upon the successful completion of this process, the elements become unresponsive to all local and remote network connections other than their designated security instances.
8. All to—and from—communications between the elements now flow through the ecosystem.

To demonstrate how identifiable ecosystem security of the present invention compares to the current security capabilities under prior art systems, a working example was created with the following:

A financial organization made a business decision to migrate from expensive static bank branches to more cost-effective Interactive Teller Machines (ITM). Identifying a location that meets the organization's requirements, the planning, compliance, permits and build out can take many months and at times over a year. Conversely, ITMs can be implemented in a matter of weeks and are inexpensive and have far fewer requirements than static branches. ITMs are easily implemented in retail shops, strip malls, office buildings, hospitals, arenas, street-side locations as well as other public and private locations. Multiple ITMs were even placed aboard a custom vehicle to create a mobile bank branch. These ITM IoT devices have special requirements to function such as connection to several remote applications and third-party vendors. These distributed and mobile ITMs must also have the flexibility to use available public or private networks to facilitate their functionality.

However, there are several challenges that prevented the organization from immediately using these technologies. The purpose-built and proprietary nature of these IoTs prevented the use of traditional prior art on-device security tools. In fact, the organization was unable to find adequate tools that were needed to satisfy their minimum standard for reasonable security using on-device technologies. Furthermore, the ITM's small footprint and limited processing and storage resources ruled out prior art network security technologies. With each IoT serving as a mini-bank, they represent high value targets and the requirement to use public or third-party networks presented high exposure and risk. Though a high-value target, physical access to the ITMs made them even easier to identify and target. As well, compromise of a single unit should not translate to compromise of the entire system. Not only should these units be protected from local and global users, but also from each other and the third-party vendors.

Regardless of the traditional security options since the ITMs were operating on a shared untrusted network, even with security, they remained visible and accessible to any device on the local network and Internet—representing an ever-present attack surface. Furthermore, the ITMs have a dependency on multiple remote and third-party applications. This meant that a unique one-off security silo had to be developed that involved collaboration and buy-in from each application owner and third-party. The ITM IoT application and third-party dependencies include: internal banking applications and system health monitoring along with several different third-parties that provide physical security monitoring, cash logistics, and credit card authorization services. Finally each ITM required integration to the organization's centralized teller center where the organization's customers could interface with a real human when desired, in a manner similar to their experience with a teller at a physical bank branch. The interaction with the teller center had to look and feel transparent with a highly polished customer experience.

Implementing the invention enabled the ITM IoT devices to connect to an isolated dedicated ecosystem limited and reserved to the IoTs specific application and supporting vendors and no other applications, systems and vendors as is the case with prior art technologies. The IoTs were able to connect to the ecosystem regardless of their distributed presence or their use of different public and or private networks for connectivity. Networks used included mobile LTE networks from multiple providers as well as facilities provided private networks with both WiFi and Ethernet interfaces. The two different ITM models that made up the organization's ITM portfolio utilized encapsulated connections to integrate into their ecosystem virtual isolation network. Despite using many different networks and network types, the ITMs operated as a member of an isolated and sealed ecosystem and were not accessible or even visible to any of the multiple local networks they relied on to access their ecosystem virtual isolation network.

All communication to and from the third-party providers, the organization and the ITMs is protected by the ecosystem where policy determines the connectivity, networking and security functions, along with flow sequence depending on the specific communication. In the future, as new and emerging technologies are developed, they may be easily implemented as internal or external modules to be used by the security instances that may provide a variety of enhancements. Once implemented all ecosystem participants may benefit from the enhancement without the need for local per ITM, per application or per third-party vendor updates or upgrades.

Since security is provided on a per element basis, in the event any individual ITM ecosystem element is compromised for any reason, the system's enforcement capabilities will prevent cross-contamination of the other ecosystem elements. As defined above, it was important to the organization that the ITMs never be allowed to communicate with one another. As such, this was implemented specified in their policy.

Beyond the ITMs, this invention also provides uniform and consistent security for the banking application, monitoring system as well as limitations and protection for and from external third-party vendors. The organization is able to continually modify or implement new policy as is required by internal teams or regulators, which is processed and implemented by the invention at the each security instance and does not require any interaction with the ITMs, internal applications or external vendors. Moreover, since no additional resources are required per ITM to perform prior art security functions, the IoT's resource were freed to support the quality of voice, video and data communications required to provide the highly polished and exceptional customer experience required for their expansion plans to be successful.

The ITMs have an associated depreciation of 5 to 8 years, however, their useful life-span ranges between 8 to 15 years. Prior art on-device or network privacy and security technologies have useful lifespan ranging between 2 to 5 years. Use of prior art technologies would not only increase risk through lack of viable tools and complexity, it would also require 1 to 4 major upgrades the technologies that would be required to secure each ITMs, applications and third-parties platforms multiplied by the number of tools needed to achieve reasonable security. With this invention continued policy changes, updates and upgrades are centralized and may be transparently implemented. The policy and element management capabilities of the invention addresses the ongoing excessive and straggler policy challenges that all systems of prior art suffer from, thereby keeping the policy appropriate, current, relevant and effective.

This invention is valuable to the organization in that without it, they would not have been able to safely facilitate their expansion plans, especially as the organization's use of distributed and mobile IoTs scales.

It will be appreciated by those ordinarily skilled in the art that the foregoing brief description and the following detailed description are exemplary (i.e., illustrative) and explanatory of the subject matter as set forth in the present disclosure, but are not intended to be restrictive thereof or limiting of the advantages that can be achieved by the present disclosure in various implementations. Additionally, it is understood that the foregoing summary and ensuing detailed description are representative of some embodiments as set forth in the present disclosure, and are neither representative nor inclusive of all subject matter and embodiments within the scope as set forth in the present disclosure. Thus, the accompanying drawings, referred to herein and constituting a part hereof, illustrate embodiments of this disclosure, and, together with the detailed description, serve to explain principles of embodiments as set forth in the present disclosure.

The invention claimed is:

1. A method for improving security and management of information technology by creating an identifiable ecosystem, comprising:
   a) configuring at least one database to accept a virtual isolation network registration therein of at least one virtual isolation network including at least one security instance operating at, at least one network security point, the at least one security instance operating with at least one segregated virtual network unit, wherein the at least one segregated virtual network unit utilizes at least one of a shared physical and virtual host kernel, having a fully contained dedicated Layer 2-7 network stack and ability to host applications, the at least one segregated virtual network unit hosting at least one application module;
   b) configuring the at least one virtual isolation network to accept a first element registration of a first element;
   c) registering the first element in the at least one database;
   d) enabling the registered first element to connect to at least one virtual isolation network via the at least one network security point to the at least one security instance;
   e) applying at least one defined security policy for the communication by the first element via the at least one virtual isolation network to at least one of a communication source or destination,
      wherein at least one defined security function is applied by the at least one defined security policy using at least one respective flow marker, based on policy triggers for pre-specified communication attributes, which references the at least one defined security policy to identify if and in what sequence communication through the at least one segregated virtual network unit and at least one application module of the at least one security instance is to be activated,
      wherein the first element communicates with an at least one additional element within the at least one virtual isolation network but is restricted from communicating beyond the at least one virtual isolation network, and
      wherein the at least one security instance is configured to include modular interconnected respective segregated virtual network units.

2. The method of claim 1, wherein the at least one element's connection for the communication is enabled by a connectivity policy.

3. The method of claim 1, wherein the at least one element communicates with at least one communication source or destination enabled by a network policy.

4. The method of claim 1, wherein the at least one defined policy is a security policy.

5. The method of claim 1, wherein the at least one defined policy is a profile policy.

6. The method of claim 1, wherein the at least one element includes a user.

7. The method of claim 1, wherein the at least one element includes an electronic device.

8. The method of claim 1, wherein the at least one element includes an IoT device.

9. The method of claim 1, wherein the at least one element includes a network.

10. The method of claim 1, wherein the at least one element includes a cloud network.

11. The method of claim 1, wherein the at least one element includes a physical facility.

12. The method of claim 1, wherein the at least one element includes a cloud instance.

13. The method of claim 1, wherein the at least one element includes a service.

14. The method of claim 1, wherein the at least one element includes an application.

15. The method of claim 14, wherein the at least one element includes a Software-as-a-Service application.

16. The method of claim 14, wherein the at least one element includes a software application.

17. The method of claim 1, wherein the at least one element includes an operating system.

18. The method of claim 1, wherein the at least one element includes a virtual machine.

19. The method of claim 1, wherein the at least one element is a connected member element.

20. The method of claim 1, wherein the at least one element is a non-connected member element.

21. The method of claim 1, wherein the at least one defined policy is uniformly applied to communications sourced from a plurality of member elements.

22. The method of claim 1, wherein the at least one defined policy is uniformly applied to communications destined to a plurality of member elements.

23. The method of claim 1, wherein the at least one defined policy is uniformly applied to the communications sourced from and destined to a plurality of member elements.

24. The method of claim 1, wherein a plurality of elements is-restricted from communicating beyond the at least one virtual isolation network.

25. The method of claim 1, wherein a plurality of elements is isolated elements restricted to communicating with only other member elements.

26. The method of claim 1, wherein the at least one element includes at least one of the following: a) a user, b) an electronic device, c) an IoT device, d) a network, e) a cloud network, f) a physical facility, g) a cloud instance, h) an application, i) an operating system, j) a virtual machine, or k) a service, and at least one policy type chosen from the group of connectivity policy, network policy, security policy, or profile policy types.

27. The method of claim 1, wherein the at least one defined policy is applied to communications sourced from the at least one member element selected from one or more of the following policy rule sources: a) the operator's geographic location, b) element's geographic location; c) type of element; d) the element's attack surface, e) source of communication, f) destination of communication, g) the geography the communication traverses, h) the standards applicable to the operator's industry, i) the standards applicable to element's industry, j) index, k) service, l) source security instance, m) source segregated virtual network unit, n) source interface, o) destination security instance, p) destination segregated virtual network unit, or q) destination interface.

28. The method of claim 1, wherein the at least one defined policy is applied to communications destined to the at least one member element selected from one or more of the following policy rule sources: a) the operator's geographic location, b) element's geographic location; c) type of element; d) the element's attack surface, e) source of communication, f) destination of communication, g) the geography the communication traverses, h) the standards applicable to the operator's industry, i) the standards applicable to element's industry, j) index, k) service, l) source security instance, m) source segregated virtual network unit, n) source interface, o) destination security instance, p) destination segregated virtual network unit, or q) destination interface.

29. The method of claim 1, wherein the at least one defined policy is applied to communications sourced from the at least one member element selected from one or more of the following policy rule destinations: a) the operator's geographic location, b) elements' geographic location; c) type of element; d) the elements' attack surface, e) source of communication, f) destination of communication, g) the geography the communication traverses, h) the standards applicable to the operator's industry, i) the standards applicable to element's industry, j) index, k) service, l) source security instance, m) source segregated virtual network unit, n) source interface, o) destination security instance, p) destination segregated virtual network unit, or q) destination interface.

30. The method of claim 1, wherein the at least one defined policy is applied to communications destined to the at least one member element selected from one or more of the following policy rule destinations: a) the operator's geographic location, b) elements' geographic location; c) type of element; d) the elements' attack surface, e) source of communication, f) destination of communication, g) the geography the communication traverses, h) the standards applicable to the operator's industry, i) the standards applicable to element's industry, j) index, k) service, l) source security instance, m) source segregated virtual network unit, n) source interface, o) destination security instance, p) destination segregated virtual network unit, or q) destination interface.

31. The method of claim 1, wherein the at least one defined policy is applied to define the behavior of the at least one element with at least one communication source internal to the ecosystem.

32. The method of claim 1, wherein the at least one defined policy is applied to define the behavior of the at least one element with at least one communication destination internal to the ecosystem.

33. The method of claim 1, wherein the at least one defined policy is applied to define the behavior of the at least one element with at least one communication source external to the ecosystem.

34. The method of claim 1, wherein the at least one defined policy is applied to define the behavior of the at least one element with at least one communication destination external to the ecosystem.

35. The method of claim 1, wherein the at least one defined policy is applied to define the behavior of the at least one element with at least one communication source located on a public network.

36. The method of claim 1, wherein the at least one defined policy is applied to define the behavior of the at least one element with at least one communication destination located on a public network.

37. The method of claim 1, wherein the ecosystem isolates a plurality of member elements operating on multiple unrelated networks.

38. The method of claim 1, wherein policy rules from the at least one defined policy are applied on member security instances at a plurality of network security points.

39. The method of claim 1, wherein specific policy rules designated as global constant from the at least one defined policy are uniformly applied to a plurality of security instances at, at least one network security point.

40. The method of claim 1, wherein specific policy rules designated as perspective from the at least one defined policy are selectively applied to the at least one security instance at, the at least one network security point wherein the at least one defined policy is chosen from at least one function comprising: a) access control, b) application control, c) application delivery, d) threshold control, e) content control, f) threat management, g) identity, h) authentication, i) privacy, j) compliance, and k) visibility and insight.

41. The method of claim 1, wherein at least one specific policy rule designated as perspective from the at least one defined policy is applied to the at least one security instance at, the at least one network security point and at least one additional specific policy rule designated as global constant from the at least one defined policy is uniformly applied to all security instances at a plurality of network security points.

42. The method of claim 1, wherein the at least one defined policy includes at least one policy rule defining connectivity policy.

43. The method of claim 1, wherein the at least one defined policy includes at least one policy rule defining network policy.

44. The method of claim 43, wherein the network policy includes at least one layer 3 forwarding table to direct the flow of communication within the at least one virtual isolation network.

45. The method of claim 1, wherein the at least one defined policy includes at least one policy rule defining security policy.

46. The method of claim 1, wherein the at least one defined policy includes at least one policy rule defining profile policy.

47. The method of claim 46, wherein the at least one defined policy includes at least one flow profile policy.

48. The method of claim 47, wherein the at least one flow profile policy includes response methods consisting of: a) the veto response method, or b) the consensus response method.

49. The method of claim 48, wherein the veto response method initiates at least one action selected from the following group of: a) allow, b) disable, c) reset, d) notify, e) redirect, f) intercept, g) duplicate, or h) log.

50. The method of claim 48, wherein the consensus response method designates at least one action value score to the communication.

51. The method of claim 48, wherein the consensus response method includes initiating a maven module.

52. The method of claim 51, wherein the maven module includes an action score threshold, a corresponding set of preconfigured actions selected from the following group of: a) allow, b) disable, c) reset, d) notify, e) redirect, f) intercept, g) duplicate, or h) log and wherein the maven module tabulates action value scores to the communication and then acts upon the communication once the action score threshold is reached.

53. The method of claim 52, wherein the maven module tabulates the action value scores into a continuously updated maven score.

54. The method of claim 46, wherein the defined profile policy defines how the at least one application module within the at least one segregated virtual network unit acts upon the communication.

55. The method of claim 54, wherein the at least one application module acts on the communication by selecting one or more from the group of the following: a) dropping, b) rejecting, c) resetting, d) alerting, e) logging, f) allowing, g) redirecting, h) intercepting and i) duplicating.

56. The method of claim 1, wherein the at least one defined policy includes at least one policy rule configured to identify one or more communication attributes and verify that the policy rule applies to the communication between the communicating elements.

57. The method of claim 56, wherein the at least one policy rule identifies the one or more communication attributes and initiates at least one preconfigured action upon the communication.

58. The method of claim 57, wherein the at least one defined policy includes the at least one policy rule to identify one or more communication attributes and initiates at least one preconfigured validator.

59. The method of claim 58, wherein the at least one defined policy is a profile policy and includes at least one violation scenario applied to the communication through at least one validator.

60. The method of claim 59, wherein the profile policy is applied by the at least one validator to initiate at least one action upon the communication.

61. The method of claim 60, wherein the at least one validator determines if the at least one violation scenario applies, the at least one validator then designates at least one preconfigured action value score to the communication.

62. The method of claim 57, wherein a flow profile policy acts upon the communication.

63. The method of claim 62, wherein the at least one defined policy specifies a flow profile policy sequence defining if and in what order the at least one application module within the at least one segregated virtual network unit acts upon the communication.

64. The method of claim 63, wherein the flow profile policy sequence includes at least one serial flow profile policy sequence.

65. The method of claim 64, wherein the serial flow profile policy sequence specifies the sequence order that the at least one enabled segregated virtual network and the at least one application module will act upon the communication.

66. The method of claim 63, wherein the flow profile policy sequence includes at least one parallel flow profile policy sequence.

67. The method of claim 66, wherein the order of the parallel flow profile policy sequence specifies the at least one segregated virtual network unit and a plurality of application modules that simultaneously act upon the communication.

68. The method of claim 63, wherein the flow profile policy sequence includes at least one serial flow profile policy sequence and at least one parallel flow profile policy sequence.

69. The method of claim 57, wherein the at least one policy rule includes at least one flow profile policy which defines if and in what order the at least one application module within the at least one segregated virtual network unit acts upon the communication.

70. The method of claim 69, wherein the at least one policy rule specifies the injection of a flow marker into the communication at, the at least one security instance.

71. The method of claim 69, wherein the at least one application module in the at least one flow profile policy is designated a corresponding profile policy that defines how the at least one application module acts upon the communication.

72. The method of claim 71, wherein the at least one application module corresponding profile policy includes at least one violation scenario and the at least one violation scenario is preconfigured with an action value score.

73. The method of claim 1, wherein the at least one segregated virtual network unit includes at least one layer 2 address table.

74. The method of claim 1, wherein the at least one segregated virtual network unit includes at least one layer 3 forwarding table.

75. The method of claim 1, wherein the at least one defined policy results in dropping of the communication without notifying the communication source.

76. The method of claim 1, wherein the first element isolated within the at least one virtual isolation network is enabled by a connectivity policy.

77. The method of claim 1, wherein the first element communicates with at least one other element within the at least one virtual isolation network, and is enabled by a network policy.

78. The method of claim 1, wherein the communication from or to the first element flows between the at least one application module hosted by the at least one segregated virtual network unit within the at least one security instance and an additional application module hosted by an additional segregated virtual network unit but not operating with a respective security instance.

79. The method of claim 78, wherein the additional application module is an external module.

80. The method of claim 79, wherein the external module disables the communication.

81. The method of claim 78, wherein the communication flow is forwarded comprising one of: 1) communication from a source within the at least one virtual isolation network to an external module, 2) communication from an external module to a destination, or 3) communication from an external module to another external module.

82. The method of claim 1, wherein the at least one application module operates in-line.

83. The method of claim 1, wherein the at least one application module is queried for a result.

84. The method of claim 1, wherein the at least one application module both operates in-line and is queried for a result.

85. The method of claim 1, wherein the first element is isolated at layer 2.

86. The method of claim 1, wherein the first element is isolated at layer 3.

87. The method of claim 1, wherein the first element connects to the at least one virtual isolation network utilizing at least one public network.

88. The method of claim 1, wherein the first element connects to the at least one virtual isolation network utilizing at least one private network.

89. The method of claim 1, wherein the first element connects to the at least one virtual isolation network utilizing at least one public and at least one private network.

90. The method of claim 1, wherein the first element utilizes at least one dedicated connection to the at least one virtual isolation network.

91. The method of claim 1, wherein the first element utilizes an encapsulated connection to the at least one virtual isolation network.

92. The method of claim 91, wherein an encapsulated connection is configured to split tunnel connection mode.

93. The method of claim 91, wherein an encapsulated connection is configured to full tunnel connection mode.

94. The method of claim 1, wherein the first element utilizes at least one dedicated and at least one encapsulated connection to the at least one virtual isolation network.

95. The method of claim 1, wherein the disabling of the ecosystem disables the at least one defined policy corresponding to the ecosystem.

96. The method of claim 1, wherein the disabling of the at least one virtual isolation network disables the at least one defined policy corresponding to the at least one virtual isolation network.

97. The method of claim 1, wherein the disabled ecosystem is re-enabled, and the at least one defined policy corresponding to the ecosystem is re-enabled.

98. The method of claim 1, wherein the disabled virtual isolation network is re-enabled, and the at least one defined policy corresponding to the at least one virtual isolation network is re-enabled.

99. The method of claim 1, wherein the at least one virtual isolation network includes a plurality of interconnected security instances connected via primary interconnects and secondary interconnects.

100. The method of claim 99, further comprising at least one primary interconnect and at least one secondary interconnect to serve as a conduit between the at least one security instance and a second security instance.

101. The method of claim 99, wherein the primary interconnects and secondary interconnects serve to enable communication among the plurality of security instances operating at local and remote network security points.

102. The method of claim 101, wherein at least one of the primary interconnects and at least one of the secondary interconnects serve as a conduit to enable the plurality of security instances to communicate and the interconnects to function redundantly if either the primary interconnect or the secondary interconnect ceases to function optimally.

103. The method of claim 102, wherein the at least one of the primary interconnects and the at least one of the secondary interconnects extend the at least one virtual isolation network from the at least one security instance at the least one network security point to a second security instance at a second network security point.

104. The method of claim 101, wherein the primary interconnects and the secondary interconnects are simultaneously active.

105. The method of claim 104, wherein when at least one of the primary interconnects is not functional, and security instances connected to and using the primary interconnect as a conduit to other security instances will now utilize the secondary interconnect at the same network security point.

106. The method of claim 1, wherein the at least one security instance includes the at least one segregated virtual network unit which security instance is connected to one or more other security instances by one or more interconnect network interfaces.

107. A method for improving security and management of information technology by creating an identifiable ecosystem, comprising:
  a) configuring at least one database to accept a virtual isolation network registration of at least one virtual isolation network including at least one security instance operating at, at least one network security point, the at least one security instance operating with at least one segregated virtual network unit, wherein the at least one segregated virtual network unit utilizes at least one of a shared physical and virtual host kernel, having a fully contained dedicated Layer 2-7 network stack and ability to host applications, the at least one segregated virtual network unit hosting at least one application module;
  b) configuring the at least one virtual isolation network to accept a first element registration therein of the first element;
  c) registering the first element in the at least one database;
  d) enabling the registered first element to connect to the at least one virtual isolation network via the at least one network security point to the at least one security instance;
  e) applying at least one defined security policy for the communication between the registered first element via the at least one virtual isolation network to at least one of a communication source or destination,
wherein at least one defined security function is applied by the at least one defined security policy using at least one respective flow marker, based on policy triggers for pre-specified communication attributes, which references the at least one defined security policy to identify if and in what sequence communication through the at least one segregated virtual network unit and at least one application module of the at least one security instance is to be activated,
wherein all communications are subject to the at least one defined security function applied by the at least one security instance, with at least one segregated virtual network unit, the at least one defined security function including at least one of: access control, application protocol control, application program control, signature threat management, behavioral threat management, identity-based control, content control, encryption, decryption, privacy control, and isolation control,
wherein the at least one security instance is configured to include modular interconnected respective segregated virtual network units, and
wherein the registered first element communicates beyond the at least one virtual isolation network.

108. The method of claim 107, wherein the at least one element includes at least one of the following: a) a user, b) an electronic device, c) an IoT device, d) a network, e) a cloud network, f) a physical facility, g) a cloud instance, h) an application, i) an operating system, j) a virtual machine, or k) a service, and at least one policy type chosen from the group of connectivity policy, network policy, security policy, or profile policy types.

109. The method of claim 107, wherein a plurality of elements communicate beyond the at least one virtual isolation network.

110. The method of claim 107, wherein the at least one element is a connected member element.

111. The method of claim 110, wherein at least one non-connected element communicates with the at least one member element.

112. The method of claim 110, wherein the at least one member element communicates with at least one non-connected element.

113. The method of claim 107, wherein the at least one element is a non-connected member element.

114. The method of claim 113, wherein the at least one non-connected element communicates with at least one additional non-connected element.

115. The method of claim 107, wherein the at least one element is a non-connected non-member element.

116. The method of claim 107, wherein the at least one defined policy is applied to define the behavior of the at least one element with at least one communication source internal to the ecosystem.

117. The method of claim 107, wherein the at least one defined policy is applied to define the behavior of the at least one element with at least one communication destination internal to the ecosystem.

118. The method of claim 107, wherein the at least one defined policy is applied to define the behavior of the at least one element with at least one communication source external to the ecosystem.

119. The method of claim 107, wherein the at least one defined policy is applied to define the behavior of the at least one element with at least one communication destination external to the ecosystem.

120. The method of claim 107, wherein the at least one defined policy is applied to define the behavior of the at least one element with at least one communication source located on a public network.

121. The method of claim 107, wherein the at least one defined policy is applied to define the behavior of the at least one element with at least one communication destination located on a public network.

122. The method of claim 107, wherein the ecosystem isolates a plurality of member elements operating on multiple unrelated networks.

123. The method of claim 107, wherein policy rules from the at least one defined policy are applied on member security instances at a plurality of network security points.

124. The method of claim 107, wherein specific policy rules designated as global constant from the at least one defined policy are uniformly applied to a plurality of security instances at, at least one network security point.

125. The method of claim 107, wherein specific policy rules designated as perspective from the at least one defined policy are selectively applied to at the least one security instance at, the at least one network security point wherein the at least one defined policy is chosen from at least one function comprising: a) access control, b) application control, c) application delivery, d) threshold control, e) content control, f) threat management, g) identity, h) authentication, i) privacy, j) compliance, and k) visibility and insight.

126. The method of claim 107, wherein at least one specific policy rule designated as perspective from the at least one defined policy is applied to the at least one security instance at, the at least one network security point and at least one additional specific policy rule designated as global constant from the at least one defined policy is uniformly applied to security instances at a plurality of network security points.

127. The method of claim 107, wherein the at least one defined policy includes at least one policy rule defining connectivity policy.

128. The method of claim 107, wherein the at least one defined policy includes at least one policy rule defining network policy.

129. The method of claim 128, wherein the network policy includes at least one layer 3 forwarding table to direct the flow of communication beyond the at least one virtual isolation network.

130. The method of claim 107, wherein the at least one defined policy includes at least one policy rule defining security policy.

131. The method of claim 107, wherein the at least one defined policy includes at least one policy rule defining profile policy.

132. The method of claim 131, wherein the at least one defined policy includes at least one flow profile policy.

133. The method of claim 132, wherein the at least one flow profile policy includes response methods consisting of: a) the veto response method, or b) the consensus response method.

134. The method of claim 133, wherein the veto response method initiates at least one action selected from the following group of: a) allow, b) disable, c) reset, d) notify, e) redirect, f) intercept, g) duplicate, or h) log.

135. The method of claim 133, wherein the consensus response method designates at least one action value score to the communication.

136. The method of claim 133, wherein the consensus response method includes initiating a maven module.

137. The method of claim 136, wherein the maven module includes an action score threshold, a corresponding set of preconfigured actions selected from the following group of: a) allow, b) disable, c) reset, d) notify, e) redirect, f) intercept, g) duplicate, or h) log and wherein the maven module tabulates action value scores to the communication and then acts upon the communication once the action score threshold is reached.

138. The method of claim 131, wherein the defined profile policy defines how the at least one application module within the at least one segregated virtual network unit acts upon the communication.

139. The method of claim 138, wherein the at least one application module acts on the communication by selecting one or more from the group of the following: a) dropping, b) rejecting, c) resetting, d) alerting, e) logging, f) allowing, g) redirecting, h) intercepting and i) duplicating.

140. The method of claim 107, wherein the at least one defined policy includes at least one policy rule configured to identify one or more communication attributes and verify that the policy rule applies to the communication beyond the at least one virtual isolation network.

141. The method of claim 140, wherein the at least one policy rule identifies the one or more communication attributes and initiates at least one preconfigured action upon the communication.

142. The method of claim 141, wherein the at least one defined policy includes the at least one policy rule to identify one or more communication attributes and initiate at least one preconfigured validator.

143. The method of claim 142, wherein the at least one defined policy is a profile policy and includes at least one violation scenario applied to the communication through at least one validator.

144. The method of claim 143, wherein the profile policy is applied by the at least one validator to initiate the at least one action upon the communication.

145. The method of claim 144, wherein the at least one validator determines if the at least one violation scenario applies, the at least one validator then designates at least one preconfigured action value score to the communication.

146. The method of claim 141, wherein a flow profile policy acts upon the communication.

147. The method of claim 146, wherein the at least one defined policy specifies a flow profile policy sequence defining if and in what order the at least one application module within the at least one segregated virtual network unit acts upon the communication.

148. The method of claim 147, wherein the flow profile policy sequence includes at least one serial flow profile policy sequence.

149. The method of claim 148, wherein the serial flow profile policy sequence specifies the sequence order that the at least one segregated virtual network unit and the at least one application module will act upon the communication.

150. The method of claim 147, wherein the flow profile policy sequence includes at least one parallel flow profile policy sequence.

151. The method of claim 150, wherein the order of the parallel flow profile policy sequence specifies the at least one segregated virtual network unit and the at least one application module that simultaneously act upon the communication.

152. The method of claim 147, wherein the flow profile policy sequence includes at least one serial flow profile policy sequence and at least one parallel flow profile policy sequence.

153. The method of claim 141, wherein the at least one policy rule includes at least one flow profile policy which defines if and in what order the at least one application module within the at least one segregated virtual network unit acts upon the communication.

154. The method of claim 153, wherein the at least one policy rule specifies the injection of a flow marker into the communications at, the at least one security instance.

155. The method of claim 153, wherein the at least one application module in the at least one flow profile policy is designated a corresponding profile policy that defines how the at least one module acts upon the communication.

156. The method of claim 155, wherein the at least one application module corresponding profile policy includes at least one violation scenario and the at least one violation scenario is preconfigured with an action value score.

157. The method of claim 107, wherein the at least one segregated virtual network unit includes at least one layer 2 address table.

158. The method of claim 107, wherein the at least one segregated virtual network unit includes at least one layer 3 forwarding table.

159. The method of claim 107, wherein the at least one defined policy results in dropping of the communication without notifying the communication source.

160. The method of claim 107, wherein the first element isolated within the at least one virtual isolation network is enabled by a connectivity policy.

161. The method of claim 107, wherein the first element communicates with at least one other element within the at least one virtual isolation network, and is enabled by a network policy.

162. The method of claim 107, wherein the communication from or to the first element flows between the at least one application module hosted by the at least one segregated virtual network unit within the at least one security instance and an additional application module hosted by an additional segregated virtual network unit but not operating with a respective security instance.

163. The method of claim 162, wherein the additional module is an external module.

164. The method of claim 163, wherein the external module disables the communication.

165. The method of claim 162, wherein the communication flow is forwarded comprising one of: 1) communication from a source within the at least one virtual isolation network to an external module, 2) communication from an external module to a destination, or 3) communication from an external module to another external module.

166. The method of claim 107, wherein the at least one application module operates in-line.

167. The method of claim 107, wherein the at least one application module is queried for a result.

168. The method of claim 107, wherein the at least one application module both operates in-line and is queried for a result.

169. The method of claim 107, wherein the first element is isolated at layer 2.

170. The method of claim 107, wherein the first element is isolated at layer 3.

171. The method of claim 107, wherein the first element connects to at the least one virtual isolation network utilizing at least one public network.

172. The method of claim 107, wherein the first element connects to the at least one virtual isolation network utilizing at least one private network.

173. The method of claim 107, wherein the first element connects to the at least one virtual isolation network utilizing at least one public and at least one private network.

174. The method of claim 107, wherein the first element utilizes at least one dedicated connection to the at least one virtual isolation network.

175. The method of claim 107, wherein the first element utilizes an encapsulated connection to the at least one virtual isolation network.

176. The method of claim 175, wherein an encapsulated connection is configured to split tunnel connection mode.

177. The method of claim 175, wherein an encapsulated connection is configured to full tunnel connection mode.

178. The method of claim 70, wherein the first element utilizes at least one dedicated and at least one encapsulated connection to the at least one virtual isolation network.

179. The method of claim 107, wherein the disabling of the ecosystem disables the at least one defined policy corresponding to the ecosystem.

180. The method of claim 107, wherein the disabling of the at least one virtual isolation network disables the at least one defined policy corresponding to the at least one virtual isolation network.

181. The method of claim 107, wherein the ecosystem once disabled is thereafter re-enabled, and the at least one defined policy corresponding to the ecosystem is re-enabled.

182. The method of claim 107, wherein the at least one virtual isolation network once disabled is thereafter re-enabled, and the at least one defined policy corresponding to the at least one virtual isolation network is re-enabled.

183. The system of claim 107, wherein the at least one virtual isolation network includes a plurality of interconnected security instances connected via primary interconnects and secondary interconnects.

184. The method of claim 183, further comprising at least one primary interconnect and at least one secondary interconnect to serve as a conduit between the at least one security instance and a second security instance.

185. The method of claim 138, wherein the primary interconnects and secondary interconnects serve to enable communication among a plurality of security instances operating at local and remote network security points.

186. The method of claim 185, wherein at least one of the primary interconnects and at least one of the secondary interconnects serve as a conduit to enable the plurality of security instances to communicate and the interconnects to function redundantly if either the primary interconnect or the secondary interconnect ceases to function optimally.

187. The method of claim 186, wherein the at least one of the primary interconnects and the at least one of the secondary interconnects extend the at least one virtual isolation network from the at least one security instance at the at least one network security point, to a second security instance at a second network security point.

188. The method of claim 185, wherein the primary interconnects and the secondary interconnects are simultaneously active.

189. The method of claim 188, wherein when at least one of the primary interconnects is not functional, and security instances connected to and using the primary interconnect as a conduit to other security instances then utilize the secondary interconnect at the same network security point.

190. The method of claim 107, wherein the at least one security instance includes the at least one segregated virtual network unit which security instance is connected to one or more other security instances by at least one interconnect network interfaces.

191. A method for improving security and management of information technology by creating an identifiable ecosystem, comprising:
   a) configuring at least one database to accept a registration therein of at least one virtual isolation network including a plurality of security instances operating at a plurality of network security points, wherein each security instance operates with a plurality of segregated virtual network units, and the plurality of segregated virtual network units, and each segregated virtual network unit hosts a plurality of application modules;
   b) configuring the at least one virtual isolation network to accept a respective registration from a respective element of a plurality of elements;
   c) registering the respective element of the plurality of elements in the at least one database;
   d) enabling the plurality of elements to connect to the at least one virtual isolation network via the plurality of security instances at a plurality of network security points;
   e) isolating the element by directing all communication via the virtual isolation network security instance and prohibiting any communication outside of the at least one virtual isolation network;
   f) applying a plurality of policy rules to define the communications through the security instances before and during the communications flow from, or to, the plurality of elements,
      wherein at least one of defined communications flow and security function is applied by the at least one defined policy rule using at least one respective flow marker, based on policy triggers for pre-specified communication attributes, which references the at least one defined policy rule to identify if and in what sequence communication through the application module operating in the at least one segregated virtual network unit within the at least one security instance is to be activated and specified the action to be taken by the application module.

192. The method of claim 191, wherein the plurality of policy rules define connectivity policy.

193. The method of claim 191, wherein the plurality of policy rules define network policy.

194. The method of claim 193, wherein the network policy includes a plurality of layer 3 forwarding tables to route the flow of communications within and beyond the at least one virtual isolation network using the plurality of application modules.

195. The method of claim 191, wherein the plurality of policy rules define security policy.

196. The method of claim 191, wherein the plurality of policy rules define profile policy.

197. The method of claim 196, wherein the communications are verified against the profile policy including at least one violation scenario applied to the communications through at least one validator.

198. The method of claim 197, wherein at the least one validator identifies whether the at least one violation scenario applies to the communications and initiates at least one action upon the communications.

199. The method of claim 196, wherein the communications are verified against the profile policy including a plurality of violation scenarios applied to the communications through at least one validator.

200. The method of claim 199, wherein the at least one validator acts to identify one or more communication attributes or behaviors and determine whether one or more of the plurality of violation scenarios applies to the communications.

201. The method of claim 199, wherein the at least one validator identifies whether the plurality of violation scenarios applies to the communications and, if so, designates at least one preconfigured action value score to the communications.

202. The method of claim 196, wherein the plurality of profile policy rules includes at least one flow profile policy.

203. The method of claim 202, wherein the at least one flow profile policy includes response methods consisting of: a) the veto response method, or b) the consensus response method.

204. The method of claim 203, wherein the veto response method initiates a plurality of actions selected from the following group of: a) allow, b) disable, c) reset, d) notify, e) redirect, f) intercept, g) duplicate, or h) log.

205. The method of claim 203, wherein the consensus response method designates a plurality of action value scores to the communications.

206. The method of claim 203, wherein the consensus response method includes initiating a maven module.

207. The method of claim 206, wherein the maven module tabulates the action value scores into a continuously updated maven score.

208. The method of claim 206, wherein the maven module includes an action score threshold, a corresponding set of preconfigured actions selected from the following group of: a) allow, b) disable, c) reset, d) notify, e) redirect, f) intercept, g) duplicate, or h) log and wherein the maven module tabulates action value scores to communications and then acts upon the communications once the action score threshold is reached.

209. The method of claim 208, wherein the maven module tabulates the action value scores into a continuously updated maven score.

210. The method of claim 196, wherein the profile policy defines how the plurality of application modules within the plurality of segregated network, functionality and computer units segregated virtual network units acts upon the communications.

211. The method of claim 210, wherein the plurality of application modules acts on the communications by selecting one or more from the group of the following: a) dropping, b) rejecting, c) resetting, d) alerting, e) logging, f) allowing, g) redirecting, h) intercepting and i) duplicating.

212. The method of claim 191, wherein the plurality of policy rules are configured to identify one or more communication attributes and verify that the policy rule applies to the communications.

213. The method of claim 212, wherein the plurality of policy rules identifies the one or more communication attributes and initiates a plurality of preconfigured actions upon the communications.

214. The method of claim 213, wherein the identification of the one or more communication attributes initiates at least one preconfigured validator.

215. The method of claim 213, wherein a flow profile policy acts upon the communications.

216. The method of claim 215, wherein the flow profile policy defines a flow profile policy sequence defining if and in what order the plurality of application modules within the plurality of segregated virtual network units acts upon the communications.

217. The method of claim 216, wherein the flow profile policy sequence includes a plurality of serial flow profile policy sequences.

218. The method of claim 217, wherein the plurality of serial flow profile policy sequences specifies the sequence order that the plurality of segregated virtual network units and the plurality of application modules act upon the communications.

219. The method of claim 216, wherein the flow profile policy sequence includes a plurality of parallel flow profile policy sequences.

220. The method of claim 219, wherein the order of the parallel flow profile policy sequences specifies a plurality of segregated virtual network unit and the plurality of application modules that simultaneously act upon the communications.

221. The method of claim 216, wherein the flow profile policy sequence includes a plurality of serial flow profile policy sequences and a plurality of parallel flow profile policy sequences.

222. The method of claim 213, wherein the plurality of policy rules includes a plurality of flow profile policies which defines if and in what order the plurality of application modules within the plurality of segregated virtual network units acts upon the communications.

223. The method of claim 222, wherein the plurality of flow profile policy rules specifies the injection of a flow marker into the communications at, the plurality of security instances.

224. The method of claim 222, wherein each of the plurality of application modules in the plurality of flow profile policies is designated a respective corresponding profile policy that defines how the plurality of application modules acts upon the communications.

225. The method of claim 224, wherein each of the plurality of application modules corresponding profile policies includes a plurality of violation scenarios and the plurality of violation scenarios are each preconfigured with a respective action value score.

226. The method of claim 191, wherein the plurality of segregated virtual network unit includes a plurality of layer 2 address tables.

227. The method of claim 191, wherein the plurality of segregated virtual network unit includes a plurality of layer 3 forwarding tables.

228. The method of claim 191, wherein the plurality of policy rules results in dropping of the communications without notifying the communications' source.

229. The method of claim 191, wherein the plurality of elements isolated within the at least one virtual isolation network are enabled by a connectivity policy.

230. The method of claim 191, wherein the plurality of elements communicates with a plurality of other elements within the at least one virtual isolation network, and are enabled by a network policy.

231. The method of claim 191, wherein the communications from or to the plurality of elements flows between the plurality of application modules hosted by the plurality of segregated virtual network units operating with the plurality of security instances and a module hosted by an additional segregated virtual network unit but not operating with a respective security instance.

232. The method of claim 231, wherein the application module hosted by an additional segregated virtual network unit but not operating with a respective security instance is an external module.

233. The method of claim 231, wherein the plurality of modules hosted by segregated virtual network unit but not operating with a respective security instance are external modules.

234. The method of claim 191, wherein the plurality of application modules operate in-line.

235. The method of claim 191, wherein the plurality of application modules are queried for a result.

236. The method of claim 191, wherein the plurality of application modules both operate in-line and are queried for a result.

237. The method of claim 191, wherein the plurality of elements are isolated at layer 2.

238. The method of claim 191, wherein the plurality of elements are isolated at layer 3.

239. The method of claim 191, wherein the plurality of elements utilize encapsulated connections to the at least one virtual isolation network.

240. The method of claim 239, wherein the encapsulated connections are configured to split tunnel connection mode.

241. The method of claim 239, wherein the encapsulated connections are configured to full tunnel connection mode.

242. The method of claim 191, wherein the plurality of elements utilize at least one dedicated and at least one encapsulated connection to the at least one virtual isolation network.

243. The method of claim 191, wherein the disabling of the ecosystem disables all policy rules corresponding to the ecosystem.

244. The method of claim 191, wherein the disabling of the at least one virtual isolation network disables all policy rules corresponding to the at least one virtual isolation network.

245. The method of claim 191, wherein the ecosystem once disabled is thereafter re-enabled, and all policy corresponding to the ecosystem is re-enabled.

246. The method of claim 191, wherein the at least one virtual isolation network once disabled is thereafter re-enabled, and all policy corresponding to the at least one virtual isolation network is re-enabled.

247. The system of claim 191, wherein the at least one virtual isolation network includes a plurality of interconnected security instances connected via primary interconnects and secondary interconnects.

248. The method of claim 247, wherein the primary interconnects and secondary interconnects serve as a conduit between or among the security instances.

249. The method of claim 247, wherein the primary interconnects and secondary interconnects serve to enable communications among the plurality of security instances operating at local and remote network security points.

250. The method of claim 249, wherein a plurality of primary interconnects and a plurality of secondary interconnects serve as a conduit to enable the plurality of security instances to communicate and the interconnects to function redundantly if either the primary interconnect or the secondary interconnect ceases to function optimally.

251. The method of claim 250, wherein the plurality of primary interconnects and the plurality of secondary interconnects extend the at least one virtual isolation network from the plurality of security instances at the plurality of network security points, to another security instance at another network security point.

252. The method of claim 249, wherein the primary interconnects and the secondary interconnects are simultaneously active.

253. The method of claim 252, wherein when a plurality of primary interconnects is not functional, and security instances connected to and using the primary interconnects as a conduit to other security instances then utilize a plurality of secondary interconnects at the same network security point.

254. The method of claim 191, wherein the plurality of security instances includes the plurality of segregated virtual network unit which security instances are connected to each other by a plurality of interconnect network interfaces.

* * * * *